United States Patent
Rigby et al.

(10) Patent No.: US 8,180,713 B1
(45) Date of Patent: May 15, 2012

(54) SYSTEM AND METHOD FOR SEARCHING AND IDENTIFYING POTENTIAL FINANCIAL RISKS DISCLOSED WITHIN A DOCUMENT

(75) Inventors: Peter Rigby, New York, NY (US); Ronen Feldman, Petach Tikva (IL)

(73) Assignee: Standard & Poor's Financial Services LLC, New York, NY (US)

( * ) Notice: Subject to any disclaimer, the term of this patent is extended or adjusted under 35 U.S.C. 154(b) by 956 days.

(21) Appl. No.: 12/102,224

(22) Filed: Apr. 14, 2008

Related U.S. Application Data

(60) Provisional application No. 60/911,744, filed on Apr. 13, 2007.

(51) Int. Cl.
G06F 15/18 (2006.01)
(52) U.S. Cl. .......................................... 706/12
(58) Field of Classification Search .................. None
See application file for complete search history.

(56) References Cited

U.S. PATENT DOCUMENTS

| | | | |
|---|---|---|---|
| 6,029,167 A | 2/2000 | Evans | |
| 6,192,360 B1 | 2/2001 | Dumais et al. | |
| 6,598,047 B1 | 7/2003 | Russell et al. | |
| 6,785,669 B1 | 8/2004 | Aggarwal et al. | |
| 2002/0147676 A1* | 10/2002 | Karmali | 705/38 |
| 2003/0033263 A1 | 2/2003 | Cleary | |
| 2004/0088308 A1 | 5/2004 | Bailey et al. | |
| 2004/0139105 A1 | 7/2004 | Trepess et al. | |
| 2005/0071217 A1 | 3/2005 | Hoogs et al. | |
| 2005/0071301 A1 | 3/2005 | Kuroiwa | |
| 2005/0114360 A1 | 5/2005 | Russell et al. | |
| 2005/0262039 A1 | 11/2005 | Kreulen et al. | |
| 2006/0015377 A1 | 1/2006 | Hoogs et al. | |
| 2006/0053176 A1 | 3/2006 | Thorpe et al. | |
| 2006/0059028 A1 | 3/2006 | Eder | |
| 2006/0080212 A1 | 4/2006 | Anderson et al. | |
| 2006/0129428 A1 | 6/2006 | Wennberg | |
| 2006/0143175 A1 | 6/2006 | Ukrainczyk et al. | |
| 2006/0184460 A1 | 8/2006 | Cleary | |
| 2008/0228815 A1* | 9/2008 | Senn et al. | 707/104.1 |

OTHER PUBLICATIONS

Huang et al. "Categorizing Unknown Text Segments for Information Extraction Using a Search Result Mining Approach", in K.-Y. Su et al. (Eds.): IJCNLP 2004, LNAI 3248, pp. 576-586, 2005.*
Li et al. "Classifictaion of Text Documents", the computer journal, vol. 41, No. 8, 1998, pp. 537-546.*
Baker, S. "Math Will Rock Your World," Business Week, (www.businessweek.com/print/magazine/content/06-04/b3968001.htm?chan=gl (Jan. 23, 2006).
Boland, E. "Financial Reporting: When Robots Write the News," CFO, p. 19 (Nov. 2006).

* cited by examiner

*Primary Examiner* — Jeffrey A Gaffin
*Assistant Examiner* — Li-Wu Chang
(74) *Attorney, Agent, or Firm* — Rothwell, Figg, Ernst & Manbeck, PC

(57) ABSTRACT

A system and method for alerting analysts to the presence of risk indicative information in a source report such as an SEC Edgar filing are described. An alert containing the risk indicative text may be e-mailed to an analyst and a link may be provided so that the analyst may easily access and view the complete report and additional identified risk indicative information. Additionally, the alerts and reports may be organized according to a hierarchical taxonomy of risk and/or corporate categories.

21 Claims, 16 Drawing Sheets the exercise of the underwriters' over-allotment option), issued 2,625,000 shares of common stock in a private placement that occurred concurrently with the closing of our initial public offering, and issued a warrant to purchase 250,000 shares of common stock. We realized $54.7 million in proceeds from these sales, net of discounts, commissions and issuance costs.

At December 31, 2001, we had $17.7 million in cash, cash equivalents and investments consisting of cash, commercial paper and taxable municipal bonds with original maturities from 0 to 180 days. In January 2000, we obtained a $3.0 million equipment line of credit with a financial institution of which $1.6 million was outstanding at December 31, 2001. In November 2000, we obtained a $5.0 million equipment line of credit with a financial institution of which $4.0 million was outstanding at December 31, 2001. Under this line of credit, we must comply with affirmative covenants that require us to maintain a specified tangible net worth value and adjusted quick ratio. We are currently in compliance with these covenants. If we fail to comply with these covenants and cannot cure our noncompliance within the periods of time identified in the agreement, we may be required to repay all of our outstanding indebtedness under this line of credit.

441

Net cash used in operating activities was $8.6 million, $19.7 million and $26.3 million for the years ended December 31, 1999, 2000 and 2001, respectively. Net cash used in operations increased from 1999 to 2000 primarily as a result of an increased net loss net of non-cash expenses including depreciation and amortization of deferred stock-based compensation, fixed assets and intangible assets, and an increase in our accounts receivable and revenue in excess of billing, offset in part by growth in accounts payable, accrued liabilities and deferred revenue. During the year ended December 31, 2000, we also paid the remaining $1.75 million of our royalty obligation.

The increase in net cash used in operations from 2000 to 2001 was primarily attributable to an increased net loss net of non-cash expenses including depreciation, amortization of deferred stock-based compensation, fixed assets and intangible assets and impairment of long-lived assets, and a substantial decrease in accounts payable and accrued liabilities, offset in part by an increase in accounts receivable, revenue in excess of billing and deferred revenue.

Net cash used in investing activities was $13.1 million, $1.9 million and $8.2 million for the years ended December 31, 1999, 2000 and 2001, respectively. Net cash used in investing activities decreased from 1999 to 2000 primarily due to net proceeds from the maturities and purchases of short-term investments of $10.4 million and offset by the purchases of property, plant and equipment of $8.5 million and our $3.0 million cash investment in e-Banc LLC. Net cash used to acquire Hatcher Associates Inc. in November 2000 was $738,000.

The increase in net cash used in investing activities from 2000 to 2001 was primarily attributable to purchases of property, plant and equipment of $6.3 million and purchase of investments of $1.9 million, coupled with the lack of proceeds from the maturities of investments as realized during 2000. We expect that, in the future, any cash in excess of current requirements will be invested in short-term, investment-grade securities. We are currently obligated to contribute an additional $1.0 million in cash to e-Banc and are in the process of structuring a note to be issued to e-Banc that would extend the date for payment of this amount until 2003. We may not be successful in structuring this note and may be required to contribute the additional funds in 2002.

Net cash provided by financing activities was $30.0 million, $62.2 million and $1.1 million for the years ended December 31, 1999, 2000 and 2001, respectively. Net cash provided by financing activities increased from 1999 to 2000 primarily due to our receipt of net proceeds of $54.7 million from the issuance of common stock in our initial public offering in April 2000, the private placement which occurred concurrently with the closing of our initial public offering and the issuance of a warrant to purchase 250,000 shares of common stock, as well as $6.8 million from borrowings under our line of credit arrangements. Additionally, in 2000, we received proceeds of $753,000 and $726,000 for the issuance of common shares under stock options and the employee stock purchase plan, respectively. We made principal payments of $823,000 on line of credit and capital lease obligations.

FIG. 3

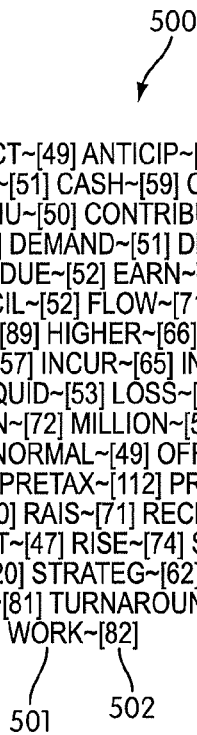

ABL~[58] ACHIEV~[64] ADVERS~[51] AFFECT~[49] ANTICIP~[58] ATTRIBUT~[64]
BILLION~[69] BOTH~[48] CAPIT~[60] CARE~[51] CASH~[59] CHALLENG~[128] COMBIN~[49]
COMPETIT~[60] CONSTRUCT~[61] CONTINU~[50] CONTRIBUT~[64] COST~[68] DEBT~[50]
DECLIN~[108] DECREAS~[96] DEFICIT~[89] DEMAND~[51] DETERIOR~[124]
DIFFICULT~[76] DOWN~[69] DRIVEN~[125] DUE~[52] EARN~[65] EXPECT~[62]
EXPENDITUR~[105] EXPERIENC~[101] FACIL~[52] FLOW~[71] GAS~[76] GM~[91]
GUIDANC~[91] HEALTH~[51] HEALTHCAR~[89] HIGHER~[66] IMPACT~[57] IMPAIR~[48]
IMPLEMENT~[51] IMPROV~[67] INCREAS~[57] INCUR~[65] INDEBTED~[77] INITI~[66]
INVENTORI~[92] LARG~[56] LEVEL~[53] LIQUID~[53] LOSS~[62] LOWER~[91]
MAINTEN~[55] MANUFACTUR~[58] MARGIN~[72] MILLION~[51] MIX~[88] NATUR~[50]
NEED~[52] NEG~[92] NET~[49] NEXT~[54] NORMAL~[49] OFFSET~[49] OIL~[75] OPER~[64]
PENSION~[90] PLAN~[49] PRESSUR~[108] PRETAX~[112] PRIMARI~[47] PRODUCT~[53]
PROFIT~[63] PROGRAM~[46] PROJECT~[90] RAIS~[71] RECENT~[50] REDUC~[64]
REDUCT~[56] RESTRUCTUR~[160] RESULT~[47] RISE~[74] SALE~[49] SATISFI~[52]
SEGMENT~[106] SIGNIFIC~[78] SPEND~[120] STRATEG~[62] STRUCTUR~[58]
SUBSTANT~[57] SUFFICIENT~[56] TREND~[81] TURNAROUND~[332] UNCERTAINTI~[61]
UNFAVOR~[191] VOLUM~[110] WEAK~[108] WORK~[82]
               /         \
             501         502

Operation Risks->Adverse Changes in Markets
   cyclical
   WITHIN_N(5, industry, sales)
   industry AND (pressure OR expect OR overcapacity OR "market share")
   sales AND (truck OR "north american")
   declined AND (years OR market)
   WITHIN_N(5, unrealized, losses) AND (derivatives OR hedges)
   volume AND (capacity OR related)
   vehicle AND (increased OR levels)
   due AND economy
   WITHIN_N(5, vehicle, sales) AND year
   "cash flow" AND unrealized
   associated AND WITHIN_N(5, power, contracts)
   competition AND competitors
   "flow hedges" AND gains
   included AND prices — 610
   deliveries AND lower
   automotive AND continued
   high AND market

413

Governance Risks->Management, Board Structure & Effectiveness
   president AND ("effective august" OR agreed OR "effective immediately" OR service OR employee)
   WITHIN_N(5, chief, officer) AND (current OR agreed OR august OR WITHIN_N(5, officer, effective) OR equal)
   director AND (serve OR independent OR appointed OR policy)
   announced AND ("vice president" OR "chief financial" OR "financial officer")
   WITHIN_N(5, president, chief) AND (appointed OR served OR WITHIN_N(5, officer, company))
   chairman AND (resignation OR non OR limited)
   directors AND (WITHIN_N(5, board, effective) OR ceo OR benefits)
   effective AND (WITHIN_N(5, president, executive) OR appointed)

606

601 {
   executive AND (carnival OR august) AND WITHIN_N(5, president, financial) AND WITHIN_N(5, vice, chief)
}
   605 / 605 / 606 chief AND companies
   current AND "vice president"   606
   officer AND salary
   company AND WITHIN_N(5, effective, august)
   benefits AND board
   april AND WITHIN_N(5, officer, company)
   employment AND stock 414 — Operational Risks->Terrorism or natural disasters
   WITHIN_N(5, gulf, mexico) AND (WITHIN_N(5, gas, production) OR WITHIN_N(5, year, hurricanes) OR quarter OR shut OR damaged OR third OR WITHIN_N(5, attributed, continued) OR interruption OR accounting OR repair OR loss OR WITHIN_N(5, higher, prices) OR demand)
   repair AND (katrina OR hurricane OR approximately OR facilities OR third OR WITHIN_N(5, costs, associated) OR rita)
   hurricanes AND (WITHIN_N(5, gas, production) OR effects OR shut OR field OR WITHIN_N(5, additional, costs) OR resulted OR barrels)
   damage AND (WITHIN_N(5, hurricane, september) OR "hurricane rita" OR interruption OR net OR resulted)
   rita AND (field OR "third party" OR based OR WITHIN_N(5, caused, damage) OR WITHIN_N(5, oil, production))
   hurricane AND (platform OR WITHIN_N(5, sustained, damage) OR drilling OR WITHIN_N(5, daily, production) OR resulting)
   shut AND (WITHIN_N(5, net, production) OR volumes OR WITHIN_N(5, daily, production))
   "hurricane katrina" AND (rigs OR quarter OR operating)

SYSTEM AND METHOD FOR SEARCHING AND IDENTIFYING POTENTIAL FINANCIAL RISKS DISCLOSED WITHIN A DOCUMENT

PRIORITY

This application claims priority from U.S. Provisional Application No. 60/911,744 filed Apr. 13, 2007, the disclosure of which is hereby incorporated by reference.

FIELD OF THE INVENTION

The present invention generally relates to computer driven review of source reports to generate alerts, wherein a computer system identifies portions of source reports that are conceptually similar to portions of previous reports which have been of high relevance or interest to analysts and alerts an analyst to the presence of such identified portions of source reports. The present invention also relates to a computer implemented hierarchy of alert categories, wherein alerts generated by the computer system are categorized according to the hierarchy of alert categories. The present invention also relates to initial training and the continuous retraining of the computer system to recognize relevant portions of source reports.

BACKGROUND OF THE INVENTION

The demands of risk and credit analysis today have placed an increasing burden on individuals responsible for reviewing and analyzing relevant documents. The market demands analyses and research that incorporates all known information and reflects a company's current risk and credit profile. These demands are occurring against a backdrop of greater analytic requirements by the market, an accelerating pace of information availability, complexity, and dissemination throughout the markets, and an accelerating growth in the volume and number of SEC filings and other sources of company information. Analysts spend a significant amount of time each year reading SEC filings in addition to their many other tasks and this invention can assist analysts in catching important disclosures as quickly as the market can.

Today's financial market transactions take place in a rapidly expanding universe of unstructured data, as evidenced by, for example, the accelerated growth in the number and volume of SEC filings. Also, there is a risk that some companies may seek to take advantage of the sheer size and complexity of some filings to disguise or play-down potentially adverse developments. Furthermore, source reports such as SEC filings arrive in lumps (e.g. quarterly filing cycles). Thus, there is a need for prioritization for human analysis and a virtually instantaneous, triage-oriented automated analysis of this mass of unstructured information.

U.S. Patent Application Publication 2005/0071217 by Hoogs et al. describes a method, system and computer product for analyzing business risk using event information extracted from natural language sources. Hoogs requires business risk model components which model a business risk measure based on "temporal proximity and temporal order of events by comparing the structured events record to the templates of pattern events stored in the database" or a Bayesian Belief Network in which "the correct prior and conditional probabilities for events and event relationships" must be encoded. Hoogs further requires templates of pattern events comprising "a number and type of events that form a pattern in an event category and temporal constraints that exist between the events" or a case library which contains "types of events, temporal order, and proximity of events, representing each case." These requirements of Hoogs constrain transfer of analysts' knowledge of risk indicators into the automated system and the type of knowledge that can be represented. Furthermore, information indicative of business risk may not be expressed with temporal language. Additionally, the method and system of Hoogs requires that web-based searches be conducted through a web browser at either "pre-defined intervals of time or at the prompting of a user of the system."

Thus, what is needed is a system and method that allows analysts to transfer their knowledge of risk indicators into the automated system without regimented temporal requirements and without needing complex business risk model components. What is needed is a system and method for risk alerting that is not limited to temporal proximities, temporal ordering, and temporal analysis. What is needed is a system and method for evaluating information as it is produced and becomes available. The system and method of the present invention is directed to meet these needs.

SUMMARY OF THE INVENTION

One aspect of the invention is the use of advanced intelligent text categorization techniques to analyze financial documents, such as SEC filings, substantially in real time credit analysis. Text that potentially indicates credit deterioration problems if flagged faster than it might have been otherwise detected, and a credit analyst is automatically alerted.

In an embodiment of the invention, there is provided a system for alerting an analyst to the presence of risk indicative information in a source report, in which the system includes a content surveillance subsystem having a text analysis software module trained with training segments to extract and score risk indicative segments of the source report; and an alert subsystem having a report generator and an alert notifier; where the report generator generates a report and an alert to be transmitted by the alert notifier to the analyst where the alert and the report have one or more risk indicative segments as extracted by the text analysis software module and where the one or more risk indicative segments in the alert are each associated with a score above a pre-determined threshold.

In another embodiment of the system, the content surveillance subsystem includes at least two said text analysis software modules and a virtual committee which is operable to combine the segments and scores of each of the text analysis software modules.

In another embodiment of the system, the content surveillance subsystem includes a Boolean searcher and a virtual committee. The Boolean searcher extracts segments matching one or more pre-stored Boolean expressions and the virtual committee is operable to enhance a score of a segment extracted by the text analysis software module where the segment or a portion thereof was also extracted by the Boolean searcher.

In another embodiment of the system, the content surveillance subsystem includes a boilerplate preprocessing module which can identify and remove boilerplate information from the source report before the text analysis software module extracts and scores risk indicative segments of the source report.

In another system embodying the invention, there is also a taxonomy database. Each training segment is associated with at least one node in the taxonomy database and the report and the alert are organized according to the taxonomy of the risk indicative segments. The taxonomy database associate each pre-stored Boolean expression with a node and a report and an alert are organized according to the taxonomy of the one or more risk indicative segments.

In another embodiment of the system, the alert subsystem also includes an alert report database, a user database, and a user interface. The notifier transmits the alert to an analyst associated with a topic of the source report as indicated in the user database, the report is stored in the alert report database, and the analyst may access the report through the user interface.

In certain specific embodiments of the system, the text analysis software module implements a Naïve Bayesian, Support Vector Machine, or Sparse Logistic Regression text analysis algorithm.

In a preferred embodiment, the system transmits an alert by e-mail. In another preferred embodiment, the user interface of the system includes a web server which allows a user to access a report using a web browser.

In certain embodiments of the system, the user interface may accept feedback from an analyst indicating whether a particular segment in the report is relevant or irrelevant.

The present invention may also be embodied in a method of alerting an analyst to risk indicative information in a source report including steps of extracting and scoring risk indicative statements in the source report with a text analysis software module trained with training segments to extract and score risk indicative segments; generating an alert containing risk indicative segments where each such risk indicative segment is associated with a score exceeding a threshold; transmitting the alert to the analyst; generating a report containing risk indicative segments; and allowing the analyst to view the report.

In a preferred embodiment of the method, the generating steps include ordering and organizing the risk indicative statements in accordance with a taxonomy.

In another embodiment, the extracting and scoring step of the method is preceded by a boilerplate preprocessing step where the boilerplate of the source report is removed.

In a preferred embodiment of the method, the transmitting step includes transmitting by e-mail. Also in a preferred embodiment of the method, the allowing step includes allowing an analyst to follow a link in the alert whereby the report is displayed in a browser window.

In yet another preferred embodiment, the transmitting step of the method is preceded by a step of identifying the analyst by querying a user database for the identity of an analyst associated with a topic of the source report.

In another embodiment of the method, the extracting and scoring step is effected with a plurality of text analysis software modules trained with training segments to extract and score risk indicative segments and is followed by a step of combining each module's extracted segments and associated scores by a virtual committee, where the combining step preceding the generating steps.

In another embodiment of the method, the extracting and scoring step includes extracting segments with a Boolean searcher each segment matching one or more of a plurality of Boolean expressions stored in a database and enhancing the score associated with each segment extracted by both the Boolean searcher and the text analysis software module.

In a preferred embodiment, the method also includes identifying an alternate analyst by querying a user database for the identity of an alternate analyst associated with at least one of a topic of the source report and the analyst; and transmitting the alert to the alternate analyst when a pre-determined period of time has elapsed since the alert was transmitted to the analyst and the report has not been viewed.

BRIEF DESCRIPTION OF THE DRAWINGS

FIG. 3 depicts an exemplary training segment and context.

FIG. 5 is an exemplary Autonomy vector after initial training.

FIG. 6 depicts exemplary Boolean-type expressions and associated taxonomy nodes.

FIG. 10A depicts an alert report displayed in a browser interface in accordance with an embodiment of the invention;

DETAILED DESCRIPTION OF THE INVENTION

Overview

Figure 1A:
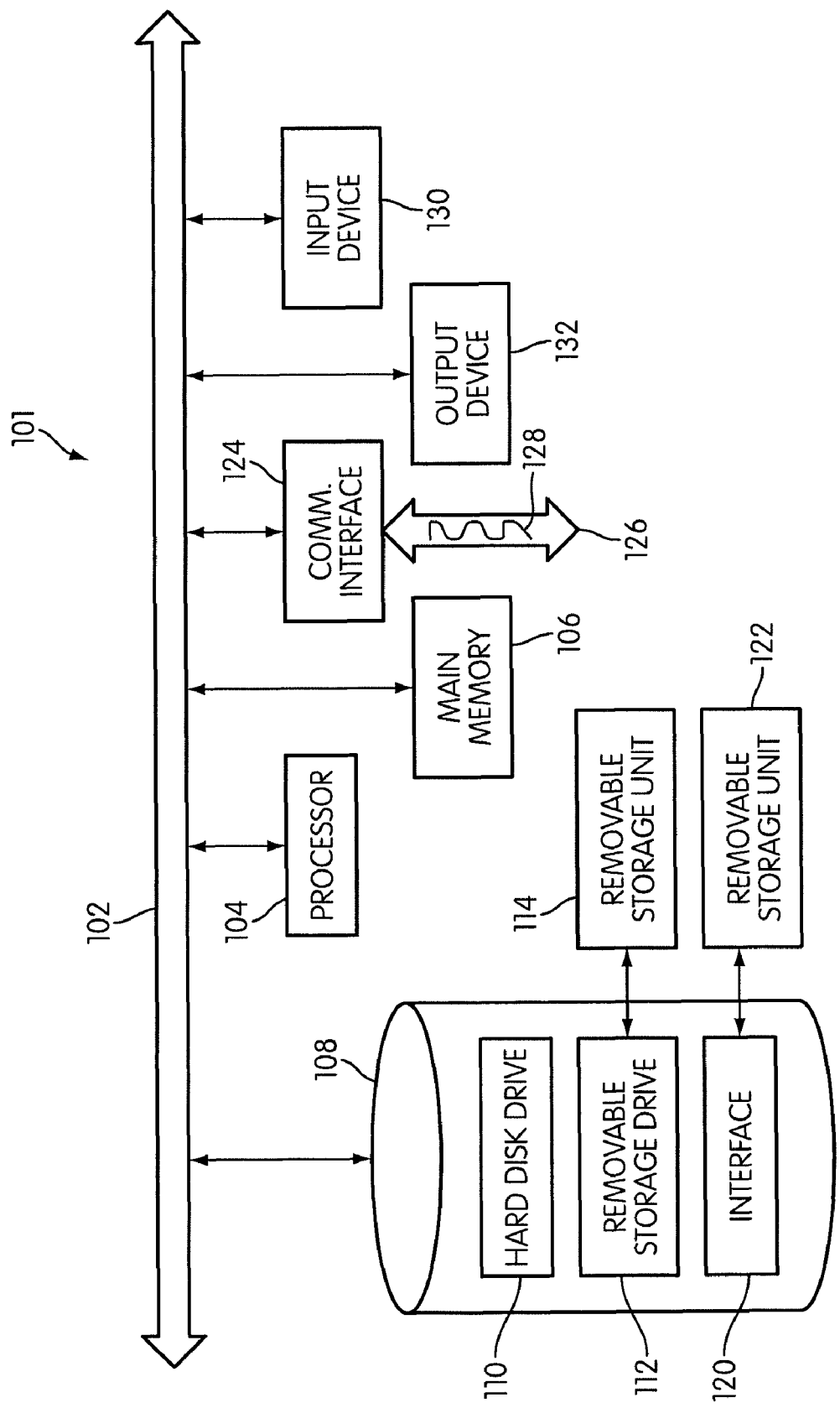
FIG. 1A depicts an exemplary computer system for software implementing the method and system of the present invention.

FIG. 1A is a block diagram that schematically illustrates a computer system 101 for executing software implementing the methods and system of the current invention. Computer system 101 includes at least one processor, such as processor 104. Processor 104 is connected to a bus (or data network) 102. Computer system 101 also includes a memory 106, which may include random access memory (RAM), read only memory (ROM) and other types of memory known to those skilled in the art. Computer system 101 also can include a secondary memory 108. Secondary memory 108 can include, for example, a hard disk drive 110 and/or a removable storage drive 112, representing a magnetic tape drive, an optical disk drive, USB slot, memory card interface, etc. The removable storage drive 112 reads from and/or writes to a removable storage unit 114 in a well known manner. Removable storage unit 114 represents a magnetic tape, optical disk, USB flash drive, CompactFlash, etc. which is read by and written to by removable storage drive 112. As will be appreciated, the removable storage unit 114 includes a computer usable storage medium having stored therein computer software and/or data. Memory devices and storage units used herein may comprise any storage medium for persistent and/or volatile storage of electronic data known to or developed by persons of ordinary skill in the art. Such data may be stored within the storage medium in a database, which may comprise any data structure and format known to or developed by persons of ordinary skill in the art, including, for example, a relational database, an object database, a flat file, list, and so on, or some combination thereof. In addition, it should be noted that the names of various "databases" described above and listed in the claims are provided for the sake of clarity and convenience only, and that a person of ordinary skill in the art would recognize that two or more differently-named "databases" could comprise different portions of a common database. For example, the taxonomy database and the training segment database (discussed below) may reside in the same file and/or database.

In alternative embodiments, secondary memory 108 may include other similar means for allowing computer programs or other instructions to be loaded into computer system 101. Such means can include, for example, a removable storage unit 122 and an interface 120. Examples of such can include a memory stick and memory stick interface, a secure digital card and interface, and other portable media and interfaces which allow software and data to be transferred from the removable storage unit 122 to computer system 101.

Computer system 101 can also include a communications interface 124. Communications interface 124 allows information (e.g., software, data, etc.) to be transferred between computer system 101 and external devices. Examples of communications interface 124 can include a modem, a network interface (such as an Ethernet card), a communications port, a PCMCIA slot and card, a USB-port, a Firewire port, etc. Information transferred via communications interface 124 is in the form of signals which can be electronic, electromagnetic, optical or other signals capable of being received by communications interface 124. These signals 128 are provided to communications interface via a channel 126. This channel 126 carries signals 128.

Computer system 101 can also include one or more input devices 130 such as a keyboard, mouse or other pointing device, microphone, and so on. Various output devices 132 may also be included in computer system 101, including a display, printer, and speakers.

In this document, the term "computer program medium" and "computer usable medium" are used to generally refer to media such as removable storage units 114, 122, a hard disk installed in hard disk drive 110, and signals 128. These computer program products are means for providing software and data to computer system 101.

Computer programs (also called computer control logic) are stored in main memory and/or secondary memory 108. Computer programs can also be received via communications interface 124. Such computer programs, when executed, enable the computer system 101 to perform the features of the present invention. Accordingly, such computer programs represent controllers of the computer system 101.

In an embodiment where the invention is implemented using software, the software may be stored in a computer program product and loaded into computer system 101 using removable storage drive 112, hard drive 110, interface 120, and/or communications interface 124. The control logic (software), when executed by the processor 104, causes the processor 104 to perform the functions of the invention as described herein. An operating system may perform basic tasks such as recognizing input from an input device 130, sending output to an output device 132, managing files and system resources, and managing the various processes embodying computer programs running on the computer system 101.

Figure 1B:
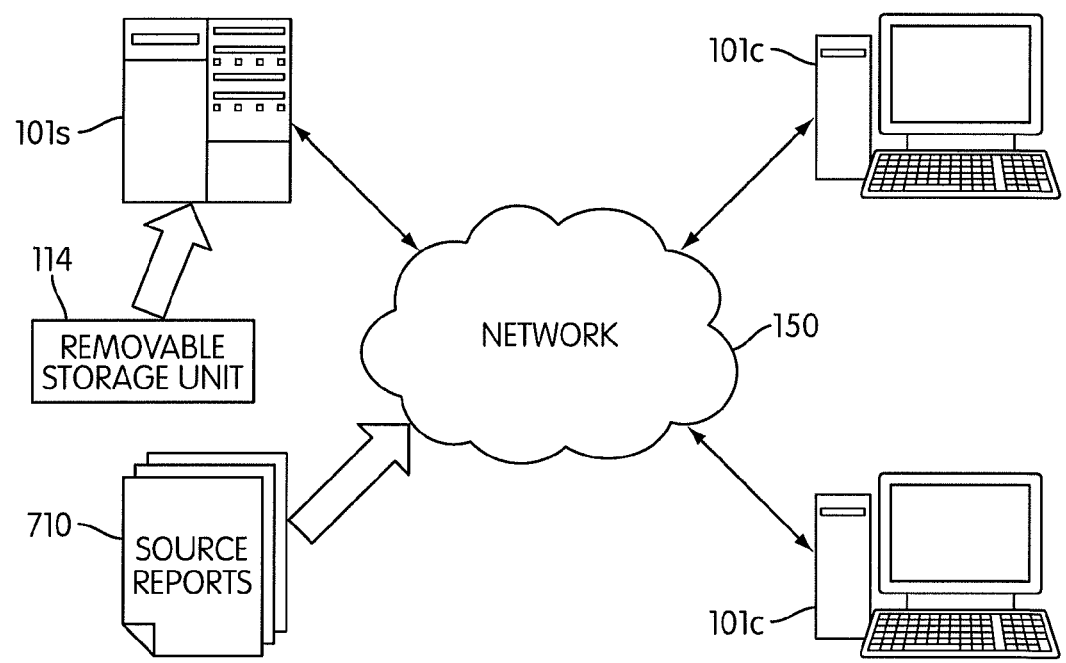
FIG. 1B depicts an exemplary computer network system for implementing the method and system of the present invention.

FIG. 1B is a block diagram that schematically illustrates networked computer systems for implementing aspects of the methods and system of the current invention. Multiple computer systems 101c and 101s, of an architecture generally described above with regard to computer system 101, can communicate with one another through network 150. Certain computer systems 101c may comprise client computer systems and other computer systems 101s may comprise server computer systems. Client computer systems 101c are generally operable to run browser, e-mail, and messaging client applications. One or more server computer systems 101s are generally operable to execute network server processes and software by which the client computer systems 101c may access the reporting and administrative features of the present invention as further described below. The databases of the present invention may reside on a single computer system 101s or be distributed across multiple computer systems 101. Source reports 710 (further described below) may be accessed and/or downloaded by computer systems 101s and 101c through the network, and/or provided on removable storage unit 114 for loading onto a computer system 101s.

The present invention generally relates to computer assisted processing of source reports to generate risk alerts and risk reports. A source report provides information regarding economic and business aspects of the subject(s) of the report and may be, for example, an SEC EDGAR filing. Generally, for analysts, time is of the essence and actions based on the content of a source report must be taken without delay because of the speed at which today's markets move. Often times, the front-line analyst responsible for initiating appropriate rating actions or commenting on company developments based on information provided in a source report is presented with and must digest many voluminous source reports all at once (for example, at monthly or quarterly report filing deadlines). Therefore, an object of the present invention is to assist analysts by providing automated means for triaging source reports—alerting analysts to relevant portions potentially indicative of risk—as they become available, thus identifying and categorizing relevant, risk-indicative portions of a source report and directing an analyst not only to a particular source report, but to one or more particular passages within the source report that are relevant.

Figure 7:
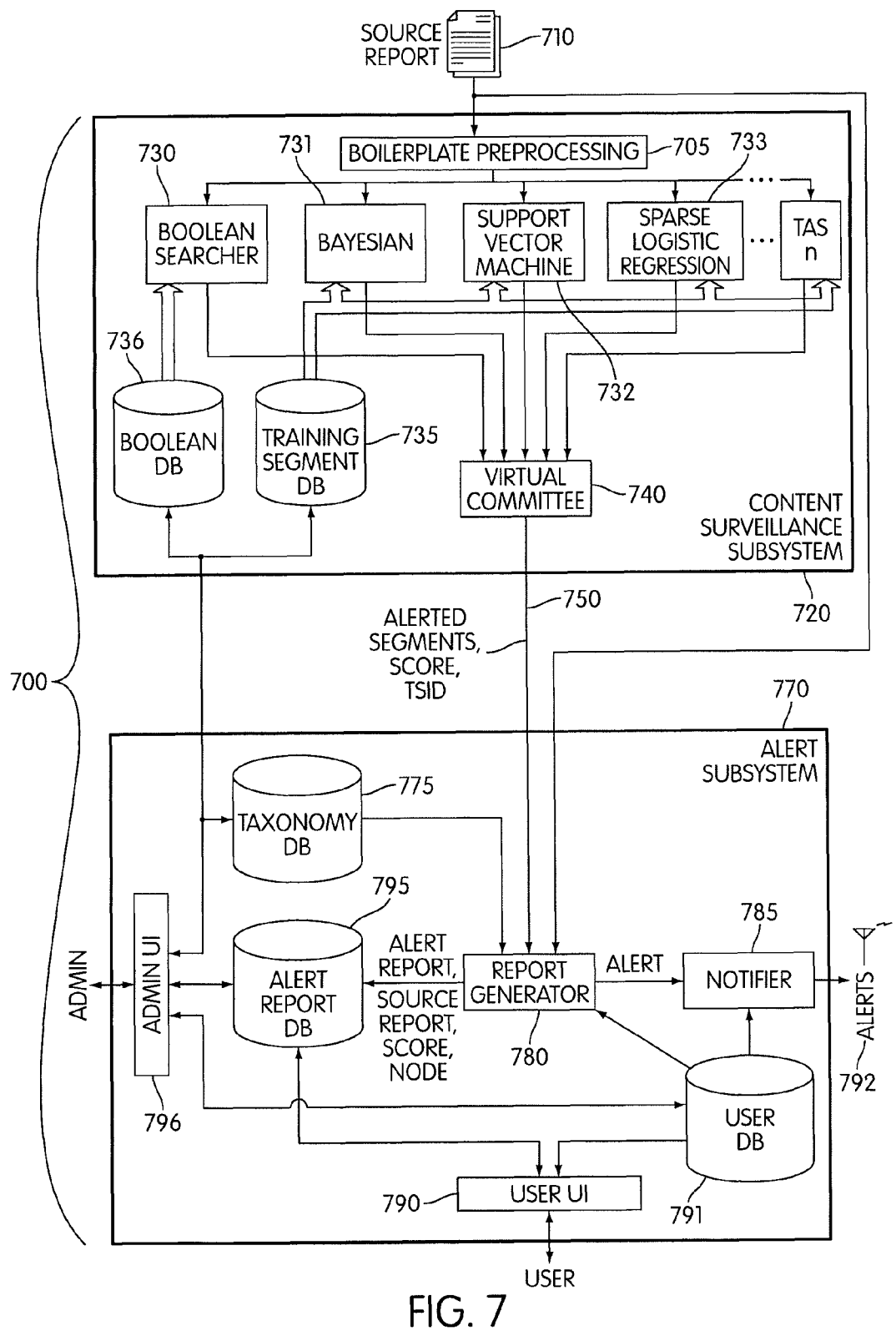
FIG. 7 depicts an exemplary system for processing a source report, generating an alert, and updating a content surveillance subsystem in accordance with an embodiment of the present invention.

As schematically illustrated in FIG. 7, the automated means which embodies aspects of the present invention is a risk alert system 700 that may be implemented on the computer system 101 (as described above) and which includes a content surveillance subsystem 720 and an alert subsystem 770. The content surveillance subsystem 720 "reads" source reports (further described below) using text analysis software ("TAS") to identify, extract, and categorize information in the document which may indicate a new credit risk development regarding the business or entity that is the subject of the report. The alert subsystem 770 creates and transmits appropriate risk alerts when information indicating risk is found by the content surveillance subsystem 720 and generates risk reports which enable an analyst to review and evaluate the risk alert and the context in which the alert information was found. To enable a TAS to identify such risk indicative statements and information, the content surveillance system relies upon a database of examples of statements (known as "training segments") that have been known historically to be indicative of credit risk, and the TAS is "trained" using such statements to locate statements within a source document that are statistically similar to one or more training segments. This database, in essence, is the knowledge of the content surveillance subsystem and not unlike the personal experience and knowledge that a trained and seasoned analyst has built over years of reading and analyzing similar documents.

A trained TAS module compares statements (known as "segments") within the source reports with training segments and/or optimized representations of training segments and generates a closeness, or relevance, score which reflects how closely a particular segment matches a training segment. A segment having a closeness score meeting or exceeding a predefined closeness threshold is considered a "match" to the training segment and is identified as a segment indicating a potential risk (an alerted segment) and an alert is generated. Such alerts may be forwarded to interested persons, e.g., analysts, who can then further review the source report, focusing primarily on the portion(s) of the source report containing the alerted segment(s), to verify that a potential risk has been identified.

A content surveillance subsystem 720 may contain more than one TAS and the alerted segments identified by each different TAS may be directed to a "virtual committee." The virtual committee may adjust the weights of the alerted segments, giving greater weight to segments alerted by more than one TAS. Additionally, the content surveillance system may contain a Boolean search module which performs a series of Boolean searches on a source report and provides its results to the virtual committee in a manner similar to a TAS.

To enhance the readability and usability of alerts generated by the alert subsystem 770, alerted segments can be topically organized. One such organization scheme involves the use of a hierarchy of topics and subtopics of increasing specificity under which training segments can be organized, and this hierarchy (also known as a "segment taxonomy" or "risk taxonomy") can be applied to alerted segments identified on the basis of corresponding training segments. By providing such hierarchical organization, the risk alert report quickly provides a categorical orientation to the user as to which aspect of the business (e.g., finances, debt, sales, market share/competition, operations, employee relations, adverse regulations, legal matters, etc.) may be giving rise to a particular potential risk.

To maintain a robust content surveillance system, the TAS is continuously trained with newly-discovered examples of risk-indicating statements or by making necessary corrections when the TAS erroneously flags statements that are not indicative of risk. Such training and retraining continually refines the ability of the TAS to distinguish between relevant and irrelevant segments.

Figure 2:
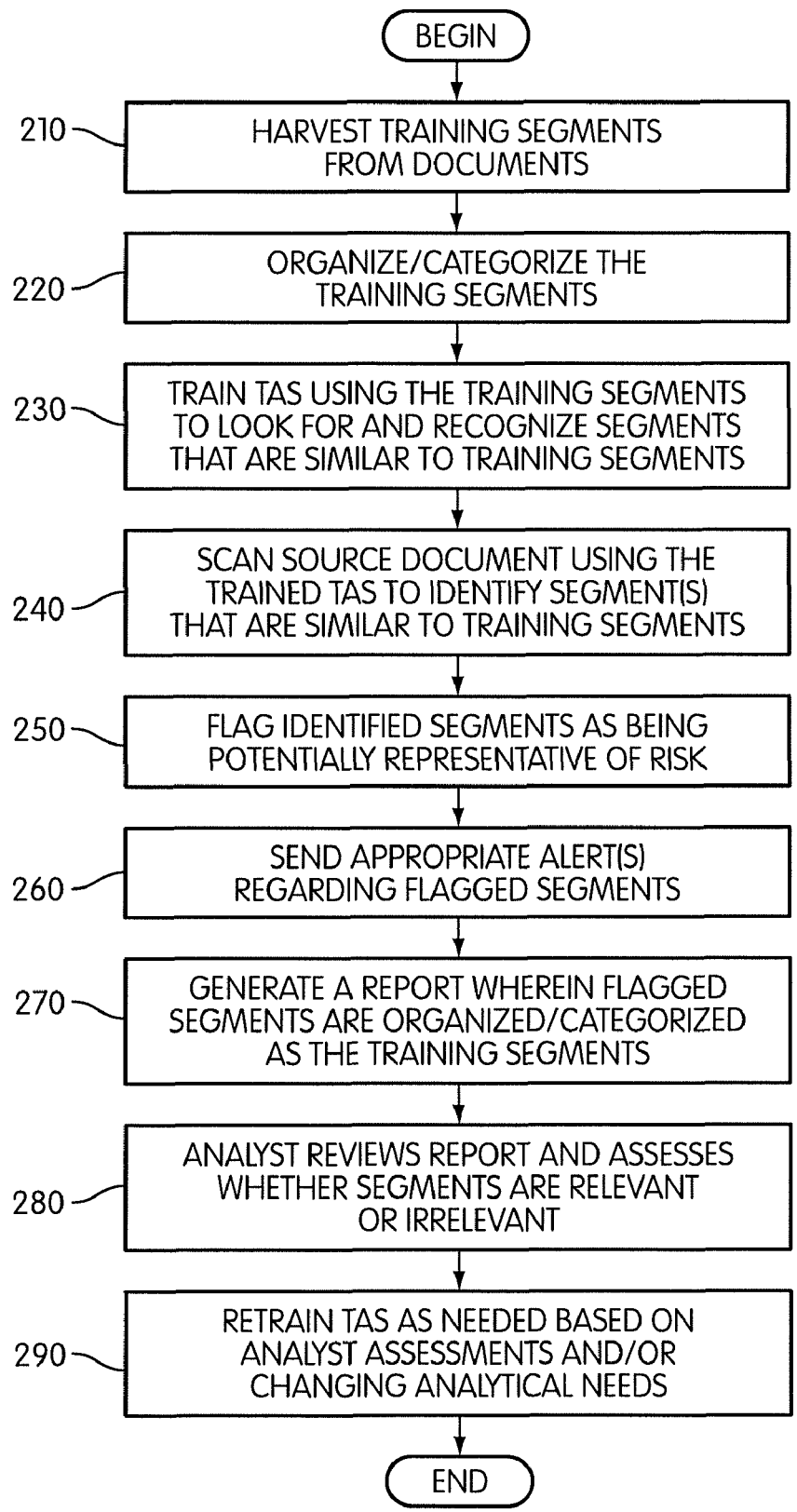
FIG. 2 depicts an exemplary sequence of steps in accordance with an aspect of present invention.

This Detailed Description of the Invention is organized first by providing definitions and then, following a description of an exemplary sequence of steps in accordance with an aspect of the invention, as depicted in FIG. 2, describing harvesting of training segments from documents 210, organizing/categorizing the training segments 220 within a taxonomy, training a TAS 230 of a content surveillance system, optional development of expression-based analyses (not shown in FIG. 2), scanning/processing 240 of a source report, flagging 250 of segments, generation 260 of alerts, presentation 270 of alert reports, analyst review 280 of a report, retraining 290, and administrative aspects (not shown in FIG. 2).

DEFINITIONS

As used herein, "source report" means a discrete collection of digitized or digitizable (or otherwise machine-readable) content (such as text, images, audio, and/or video) which provides information regarding financial and/or business aspects of the subject(s) of the report, such as that contained in an SEC corporate filing (for example, but without limitation, 10-k, 10-k/A, 10-Q, 10-Q/A, 8-k, DEF and PRE proxies, S-4), company transcripts, NAIC reports, company earnings conference calls, Factiva® news items, industry trade publications, blogs and other internet-based sources, and NewsEdge™ news clips. These source reports often have a single company as a subject.

As used herein, "segment" means a portion, or subsection, generally contiguous, from a source report, such as a part or whole of a sentence, page, or paragraph of text or speech.

As used herein, a "training segment" is a segment which has been previously associated with a risk and, in the opinion of an analyst or other person of ordinary skill in the art, a segment that is sufficiently similar to the training segment is potentially indicative of the same or similar risk.

General Description

With reference to FIG. 2, a process according to the present invention, would include the following steps. First, analysts' know-how and expertise is utilized to harvest exemplary segments associated with risk in a step of identifying and harvesting training segments from documents (e.g., source reports) 210. The harvested training segments may comprise previously observed expressions of information that indicated an actual financial risk in a historical financial reporting document Training segments so harvested may be organized and categorized in step 220 in accordance with a risk taxonomy. Training segments are then used to train a TAS in step 230 so that a TAS can search for and recognize segments indicating similar risks in a source report. Once a TAS is trained, it may be provided with a source report for scanning in step 240 in which a TAS identifies segments similar to training segments. Such segments are flagged in step 250 as being potentially representative of risk and alert(s) regarding flagged segments are sent to analysts in step 260. Additionally, a report may be generated in step 270 wherein flagged segments are organized according the taxonomy of step 220. In step 280, an analyst may review the report and provide feedback as to the relevancy of the flagged segments. Such feedback may be used in step 290 in which the TAS is retrained. Step 290 may also include retraining based upon changing analytical needs.

Instantiating and Training the Content Surveillance Subsystem

Segment Harvesting (Step 210)

Before the risk alert system 700 can generate alerts and alert reports, the TAS of the content surveillance subsystem 720 must be trained to identify segments that are potentially indicative of risk. Therefore, according to an aspect of the invention, the content surveillance subsystem 720 includes one or more TAS modules (described in more detail below) that can be trained to identify relevant segments within a body of text. A TAS module is trained on a plurality of training segments identified by analysts from prior source reports which are relevant to an alerting requirement. The analyst's touchstone for identifying such segments will generally be in consideration of the question, "would I have wanted to be alerted to this fact or disclosure (i.e., the information provided) in this segment?" If the answer is "yes," then the segment becomes a training segment. For each known type of risk (taxonomies of risk categories are described below), examples of texts which reflect, are indicative of, or otherwise correspond to the risk are harvested from actual source documents, such as, previous SEC filings. In some cases, hundreds or even thousands of examples are harvested for each risk.

With reference to FIG. 3, an analyst reading a page of a company's SEC 10-q report such as exemplary report page 300 might flag segment 441 as potentially indicative of risk. Such a segment 441 would likely be harvested as a training segment. Segment 441 illustrates that a segment need not be a complete sentence, contain punctuation, or use sentence capitalization. The following examples provide further illustration of training segments.

Examples 1A and 1B

An analyst studying a source report might identify the following segments as among those indicative of adverse changes in markets as a corporate operational risk and "harvest" them as training segments:

Example 1A

"We experienced losses in our natural gas and power contracts as a result of general market declines in energy trading resulting from lower price volatility in the natural gas and power markets and a generally weaker trading and credit environment."
and

Example 1B

"The impact on earnings of the continued downturn in the forestry equipment markets raised questions as to whether the Company would meet the covenants for leverage and interest coverage ratios of the Credit Agreement."

Examples 2A and 2B

Likewise, an analyst reading a source report, such as an SEC EDGAR 10-k report, might identify the following segments as among those indicative of counterparty operational risks and harvest them as training segments for the content surveillance subsystem:

Example 2A

"We also experienced difficulty in 2002 and 2003 in collecting on several claims from various industry participants experiencing financial difficulty, several of whom sought bankruptcy protection."
and

Example 2B

"Reflecting the loss of a major tread rubber customer"

Examples 3A and 3B

In selecting how much of a source report to use as a segment, shorter, focused segments have been found to provide better training for the system than longer segments. Lengthy segments are apt to contain irrelevant material (material not indicative of any risk). Further, date phrases (such as "On Sep. 23, 2005, we filed . . . ") are generally not useful in training segments and can potentially cloud results. The following exemplify a good segment and its shortening to be more effective:

Example 3A

Good

"As of Sep. 30, 2005, due to losses incurred in connection with Hurricanes Katrina and Rita, the value of the Company's assets did not exceed the total of its liabilities, issued share capital and share premium accounts. As a result, the Company would therefore not be able to pay a dividend under Bermuda law as of Sep. 30, 2005."
and

Example 3B

Better

"due to losses incurred in connection with Hurricanes Katrina and Rita, the value of the Company's assets did not exceed the total of its liabilities, issued share capital and share premium accounts. As a result, the Company would therefore not be able to pay a dividend."

Thus, the process of harvesting training segments may include, in addition to simply identifying risk-indicative segments from actual documents, editing the identified segments to make them shorter and more focused, for example, by deleting irrelevant words and phrases and deleting date phrases.

Examples 4A, 4B, 4C, 4D, and 4E

An analyst reviewing a source report, such as a transcript of a company earnings conference call, might identify the following segments as among those indicative of the company's risk of declining cash flow or earnings (note that a segment may be an unpunctuated sentence fragment):

Example 4A

"we were required to repay all of our outstanding indebtedness under our revolving credit facilities."

Example 4B

"our only alternative to commencing bankruptcy proceedings"

Example 4C

"The Company has suffered a significant loss from operations during the current year, has a working capital deficit, is currently in default on certain of its debt instruments, and will require capital funding from sources other than operations to meet its current debt obligations."

Example 4D

"Given our cash balance, we anticipate that we will require additional financing in order to fund our obligations under the farm-in agreement."
and

Example 4E

"we have had to prepare a contingent stand-alone business plan, focusing on cost reduction and cash flow generation"

The segments listed in the examples above represent statements that had previously been found to indicate risk and therefore would be candidates to be harvested as training segments for the content surveillance subsystem 720.

Segment harvesting may also involve collecting segments that are known to not contain information that would be relevant to potential risks. Examples of such segments may include boilerplate disclosure language, safe harbor disclosures, or other fragments previously identified as being irrelevant. These segments—known as negative examples, as opposed to training segments of relevant text known as positive examples—can be used in accordance with aspects of the present invention for discarding text from a source document that is highly likely to contain irrelevant information. This is described in more detail below.

Organization/Categorization 220 of Training Segments: Creation and Updating of Risk Taxonomy Depending on the nature and source of a risk associated with a training segment, the training segments may generally fall under one or more of several different topical categories, and as analysts harvest training segments, they may also associate each harvested segment with a category based on the nature of the potential risk indicated by the training segment. For instance, Examples 1A and 1B above are relevant to corporate operational risk, Examples 2A and 2B are relevant to counterparty operational risk, and Examples 4A-E are relevant to risk of declining cash flow or earnings Segment harvesting may result in thousands of training segments for the content surveillance subsystem 720. According to another aspect of the invention, in order to aid in the organization and handling of training segments and further to aid analysts in assessing an alert or alert report, training segments may be topically categorized within a hierarchical risk taxonomy adapted for the purpose of organizing risk alerts and alert reports wherein alerted segments are grouped according to their associated category.

Figure 4:
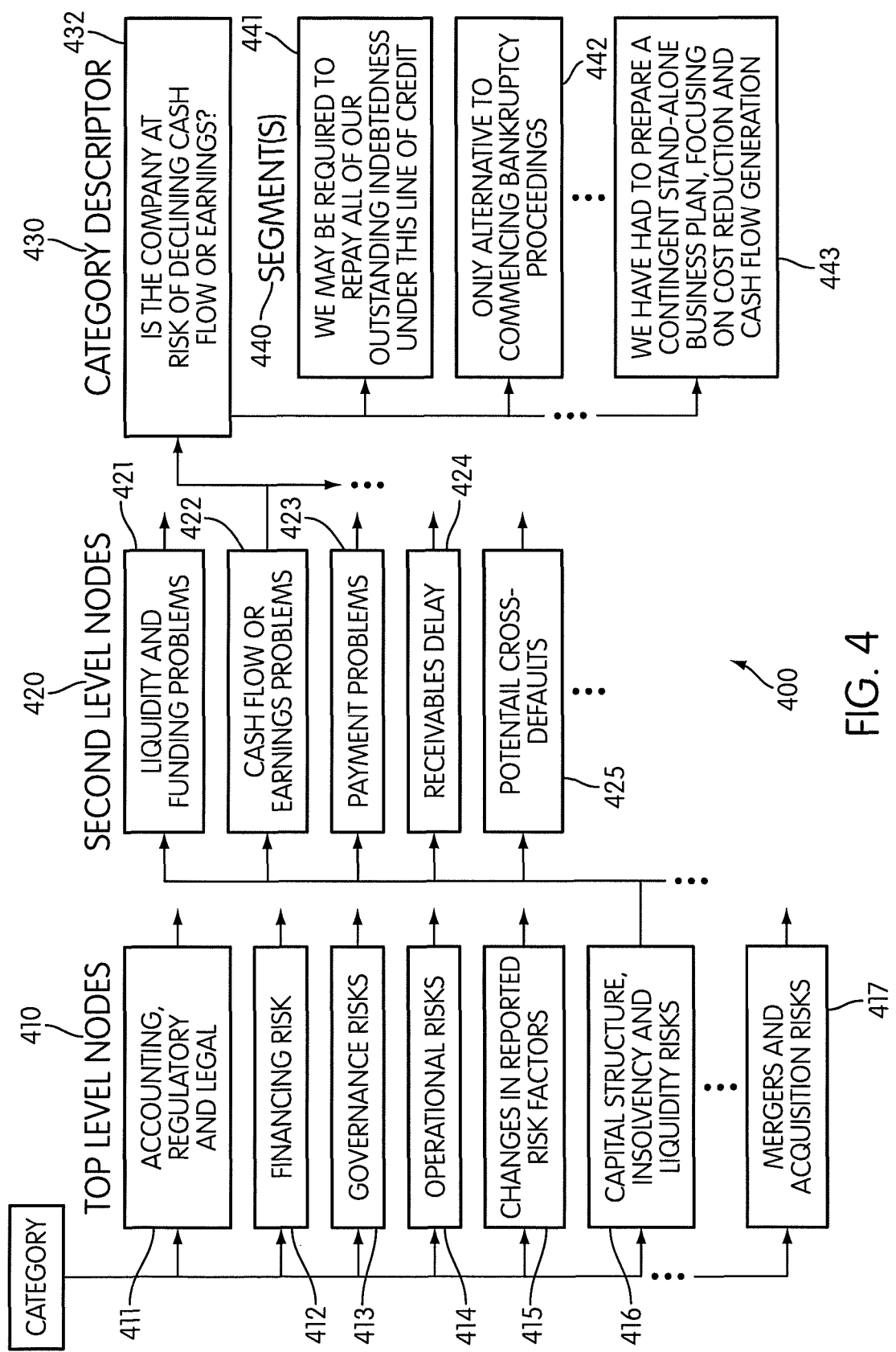
FIG. 4 depicts a partial exemplary risk taxonomy and associated segments.

Therefore, training segments can be categorized in a hierarchy of risk nodes, a partial example of which is illustrated schematically by reference number 400 in FIG. 4. Each training segment 440 is categorized under at least one second-level node 420 and even more generally under a top-level node 410. Each second-level node may be associated with one or more subcategory descriptors which can aid an analyst in identifying training segments which are properly organized under that second-level node. For example, the training segments identified in Examples 1A and 1B above are indicative of a corporation's operational risk, and more particularly, adverse changes in its market. Thus, these training segments might be associated within a top-level node or category of "operational risks" 414 and a second-level node or subcategory of "adverse changes in the market" (not shown in FIG. 4). A hierarchy of risk nodes 400 may include other levels, and while FIG. 4 shows several nodes for each level, one or more levels may include only a single node.

Top level nodes represent general topical categories under which training segments may be organized. As shown in FIG. 4, exemplary top-level categorical nodes 410 may include:
 1. Accounting, Regulatory and Legal 411,
 2. Financing Risks 412,
 3. Governance Risks 413,
 4. Operational Risks 414,
 5. Changes in reported risk factors 415,
 6. Capital Structure, Insolvency and Liquidity Risks 416, and
 7. Mergers and Acquisition Risks 417.

As one skilled in the art can discern, other top-level nodes and organizations of top-level nodes can be conceived which would form a basis for systematic risk analysis. Additionally, as the art of risk analysis changes in response to changes in company operations, business methods, the business environment, regulation, and reporting procedures and/or requirements, other top-level nodes may be created or existing ones eliminated or subdivided.

Each top-level node 410 can be divided into one or more second-level nodes 420 representing topical subcategories of greater specificity within the top-level node risk issue.

For example as shown in FIG. 4, top-level node "Capital Structure, Insolvency and Liquidity Risks" 416 may have the following second-level nodes 420:
 1. Liquidity and Funding Problems 421
 2. Cash Flow or Earnings Problems 422
 3. Payment Problems 423
 4. Receivables Delays 424
 5. Potential Cross Defaults 425

In the illustrated taxonomy, each of the second-level nodes 420 are associated with one or more subcategory descriptors 430. Ideally, subcategory descriptors provide explanations which help the user/reader/analyst understand the nature of the information and segments encompassed within each particular second level node. For example, as shown in FIG. 4, second-level node "Cash Flow or Earnings Problems" 422 may be associated with the subcategory descriptor, "Is the company at risk of declining cash flow or earnings?" 432. Segments 440 which satisfy any of a second-level node's subcategory descriptors 430 are organized under the associated second-level node 420. For example, as shown in FIG. 4, the following training segments are organized under second-level node 422 and are described by the subcategory descriptor 432:
 "we may be required to repay all of our outstanding indebtedness under this line of credit" 441
 "only alternative to commencing bankruptcy proceedings" 442
 "we have had to prepare a contingent stand-alone business plan, focusing on cost reduction and cash flow generation" 443

As another example from the first exemplary embodiment of top-level nodes 410, the top-level node "Governance Risks" 413 may have the following second-level nodes, not depicted in FIG. 4, and associated subcategory descriptors (second-level nodes hereunder denoted with a numeral, e.g., 1, 2, 3, etc; subcategory descriptors hereunder indented and denoted with a lower-case letter, e.g., a, b, c, etc.):

Governance Risks
 1. Ownership Structure & External Influences
  a. Inappropriate or risky transactions that may benefit certain shareholders at the expense of creditors or small shareholders, particularly related party transactions between owners (particularly block holders) and/or managers and affiliated companies.
  b. Significant changes in ownership, particularly if it is not transparent who the underlying beneficial owner is.
  c. Company is directly influenced by governments or regulators to act in a way that detracts from commercial interests and credit quality.
 2. Shareholder Rights and Stakeholder Relations
  a. Dividend waivers
  b. Precatory (non binding) shareholder resolutions being affirmed by a majority of shareholders, but not acted upon by management
  c. Launching securities class action lawsuits
  d. Abolishing poison pills or other takeover defenses
 3. Transparency, Disclosure and Audit
  a. Failure to file one or more required reports on a timely basis
  b. Qualified accounting opinions.
  c. Evidence of material weaknesses stemming from SOX 404 disclosure.
  d. Restatement of prior financial statements that have a material effect on cash flow or leverage.
  e. New complicated or off-balance sheet financings that may have the effect of hiding debt.

f. An abrupt change of auditors, perhaps signaling a dispute over accounting filings.
g. Evidence that suggests the company has inadequate audit or financial controls.
4. Management, Board Structure & Effectiveness
a. Abrupt resignation of key officers such as the CEO, CFO, Treasurer or of key board members, particularly the audit committee chairman.
b. Significant or majority votes against a slate of directors or an individual director that are not acted upon by the board.
c. Material exercise of options or sale of stock by key officers and board members.
d. Material change in the company's code of ethics that could signal underlying difficulties.
e. Change of outside counsel, perhaps signaling that counsel has taken an exception to the company's practices.
f. Re-pricing of options generally or for executive management specifically.

As another example using the first exemplary embodiment of top-level nodes 410, the top-level node "Operational Risks" 414 may have the following second-level nodes, not depicted in FIG. 4, and associated subcategory descriptors (second-level nodes hereunder denoted with a numeral, e.g., 1, 2, 3, etc; subcategory descriptors hereunder indented and denoted with a lower-case letter, e.g., a, b, c, etc.):

Operational Risks
1. Counterparty and Settlement Problems
a. Delays or problems in settling trades or financial transactions.
b. Excessive exposure to low credit quality counterparties.
2. Adverse Changes in Markets
a. Have markets for a company's products or services changed in a way that threatens the credit profile?
b. Has a new competing product entered the market?
3. Supply Chain Interruptions
a. Disruptions or increased risk of disruptions to a company's key supply chain.
b. Changes in the distribution channels for insurance companies.
4. Adverse Changes in Customer Mix
a. A material loss of a key customer or customer group, or a change in the financial health/credit profile of key customers.
b. Have customers gained greater pricing power over suppliers?
5. Business Operation Interruptions
a. Material interruptions to a company's operations sufficient to adversely affect cash flow either by raising costs or lowering revenues, or both (i.e., a force majeure event).
b. Has a recent force majeure event disrupted cash flows?
6. Political Threats
a. Changes in the political environment that threaten the business.
b. Political events that may affect the industry's regulatory structure.
7. Adverse Technology Developments
a. Technologies or processes that are operating below design, sufficient to adversely affect cash flow.
b. Evidence that a company is excessively reliant upon an unproven technology that is proving unreliable.
8. Breakdown in Risk Management Controls
a. Evidence that enterprise risk management controls are inadequate.
b. Violations of key approval policies.
9. Product or service failures
a. Notification that a core product or service is not working well.
b. A mass recall.
10. Disputes with Unions
a. Labor disputes or problems with the collective bargaining unit or the union.
b. Growing bargain strength among key labor unions.
11. Terrorism or natural disasters
a. Terrorism based threats or events that threaten the company's cash flow or ongoing concerns.
b. Natural disasters that threaten the company's cash flow or ongoing concerns.
12. Joint Venture or Partner Problems
a. Evidence or disclosure that a joint venture or partnership is falling apart, not working, or is an emerging liability.
b. Disclosure of termination of a joint venture.
13. Bad Loan Problems
a. Sharp linked-quarter deterioration in loan quality metrics or increase in bad loans provisions for lending institutions.
b. Significant write-off of bad loans.
14. Deterioration in Regulatory Capital Ratios
a. Tier 1 capital ratio below 2%.
b. Regulatory request to carry additional capital for specific risks identified.
15. Trading Problems
a. Disclosure of unauthorized trading, losses due to unauthorized trading.
b. Trading losses due to newly discovered technical or information technology failures.

Figure 13:
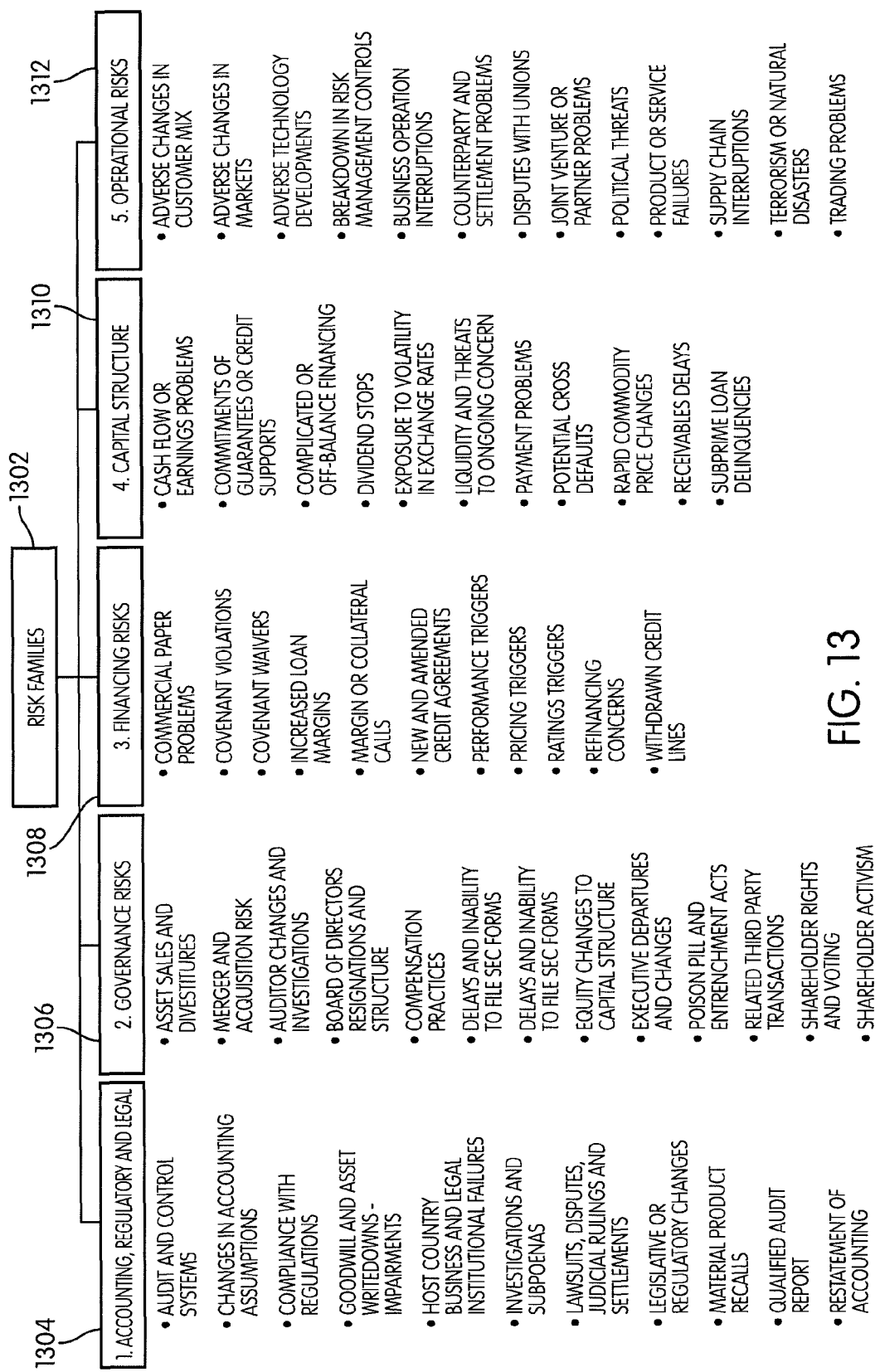
FIG. 13 depicts an alternative risk taxonomy.

An alternative representation of a risk taxonomy is shown in FIG. 13. In FIG. 13, risks are categorized as risk families 1302 The families illustrated in FIG. 13 comprise "Accounting, Regulatory and Legal" 1304; "Governance Risks" 1306; "Financing Risks" 1308; "Capital Structure" 1310; and "Operational Risks" 1312. The taxonomy of FIG. 13 is essentially a two-node taxonomy, with each family 1304-1312 comprising a first node, and each identified risk within each family comprising a second node. Training segments indicative of each risk are harvested and are stored in the training segment database 735 where they are associated with at least one risk.

As one skilled in the art can discern, other second-level and subcategory descriptors can be conceived which would form a basis for systematic risk analysis within a given top-level node category. Additionally, as the art of risk analysis changes in response to changes in company operations, business environment, business methods, regulation, and reporting procedures and/or requirements, new second-level nodes may be created or existing ones subdivided, removed, or modified.

Furthermore, one skilled in the art can see that the hierarchy is not necessarily limited to top- and second-level nodes. Additional levels could be added as the need for more focused topical alerts is discerned. The creation of additional node levels (depth) would be balanced against the potential risk of burying lower-relevance alerts and requiring the analyst to do too much "drilling down" in order to view all alerts identified in a given source report. "Drilling down" is required to reach deep category nodes and may involve repeated "clicking open" of folders representing each level in the hierarchical category chain to reach a given alert. Likewise, the hierarchy could be selectively "flattened" whereby fewer, but broader, categories exist (breadth). However, flattening would have to be balanced against the potential of too many alerts being identified within a single category, requiring an analyst to scroll through large lists of alerted material.

Altogether, this hierarchy of risks embodied within the structure of top-level nodes and second-level nodes provides a taxonomy for organizing and instantiating the knowledge base within a content surveillance subsystem and categorizing alerts and alert reports for analysts and other users.

Training the Content Surveillance Subsystem (Step 230)

The content surveillance subsystem includes one or more text analysis software ("TAS") modules. Text analysis software, sometimes known as text mining or data mining software, extracts and analyzes the content of the text. Systems may look for word patterns or other features of the text in common with pre-defined exemplars, i.e., training segments. Various text analysis algorithms have been developed and are described in the technical literature, including U.S. Pat. No. 5,640,492. For example, Naïve Bayesian Analysis, Sparse Logistic Regression, generalized linear classifiers, such as support vector machines or maximum margin classifiers, and many others are embodied in various commercially available text analysis software products, such as Autonomy Corporation's IDOL Server™, ClearForest™, Vivisimo, and Recommind™ MindServer™. In some embodiments, a content surveillance system is operable to store a large number of training segments and/or efficient representations of training segments in its database and to use statistical modeling, matching, similarity scoring techniques, or some combination thereof to identify segments of a source report similar to the training segments.

The content surveillance subsystem generally receives substantial training before the risk alerting system is initially operational. The content surveillance subsystem may also be trained from time to time as additional training segments are identified or the taxonomy is expanded, training the content surveillance subsystem to recognize new text patterns associated with existing or newly added taxonomy nodes (i.e., types of risks).

Each training segment is associated with a taxonomy node in a taxonomy database. With reference to FIG. 4, for example, the training segment "we may be required to repay all of our outstanding indebtedness under this line of credit" 441 falls under and is associated with second-level node "Cash Flow or Earning Problems" 422 and top-level node "Capital Structure, Insolvency and Liquidity Risks" 416.

In one embodiment, a classification algorithm, such as, a generalized linear classifier, is used to extract relevant semantic features from the training segment and generate a multi-dimensional vector of features for the segment that is stored, for example, in the training segment database 735.

Training segments are fed into the knowledge base of the content surveillance subsystem 720 in order to train the system to recognize the characteristics of segments indicative of each risk node. With reference to FIG. 3, the training segment 441 is shown in its context 300, about one page from an exemplary SEC 10-q report. An exemplary TAS module, such as the IDOL server from Autonomy, performs a number of steps when adding training segments to its database. Autonomy performs a "stemming" process in which word endings such as "ing" and "ed" are removed. Text may be converted into a vector in which infrequently used words have higher weights and, conversely, high frequency words are given relatively lower weights. Typically a vector contains a plurality of stemmed words, each associated its weight or "magnitude." Each stemmed word represents a "dimension" in a multi-dimensional space and the corresponding weight or "magnitude" is the distance in that "direction." An exemplary Autonomy vector 500 as shown in FIG. 5, associated with first-level node "Capital Structure, Insolvency and Liquidity Risk" and second-level node "Cash Flow or Earnings Problems" contains a plurality of stemmed words and weights. For example, the stemmed word WORK 501 has weight 82 502 in this vector. Known mathematical formulae may be used to compare vectors stored in the training segment database with vectors of source reports, as described below.

Boolean Search Expressions

The content surveillance subsystem 720 may also include a Boolean searcher 730 which determines whether a source report meets one or more Boolean expressions. Such Boolean expressions can be used to further filter the content and to capture specified patterns such as word proximity, word associations, and word sequences. An expression-based searcher relies upon expressions containing literal terms and optional operators. With reference to FIG. 6, an exemplary rule or expression 601 may contain keywords 605 such as "executive," "carnival," "august," "president," "financial," "vice," and "chief." A Boolean expression may also contain Boolean operators 606 such as AND, OR, and NOT. Additionally, an operator 606 such as the proximity operator WITHIN_N is available, where, for example, a term such as "WITHIN_N(5, president, financial)" will be matched when the source report contains "president" within five words of "financial." Each expression may be associated with a particular risk category or hierarchical node in the risk taxonomy. For example, the exemplary expressions depicted in FIG. 6 are associated with top level nodes Operation Risks 214 and Governance Risks 213.

Boolean expressions may be created manually, automatically, or both. For example, the exemplary expressions of FIG. 6 were obtained by using a statistical based rules generator. Additionally, an analyst familiar with the syntax and structure of Boolean expressions as described above may create expressions based on exemplary segments indicative of risk. For example, an analyst considering the implications of the text of Example 1A (above), might consider a Boolean expression such as WITHIN_N(7, losses, contracts) as a potential expression to be added to the Boolean database. Furthermore, an expression such as "deliveries AND lower" 610, generated automatically by the keyword extraction feature, may be found to be too broad and modified to WITHIN_N(5, deliveries, lower) or removed altogether from the Boolean database.

Validation

Instantiation and updating of the content surveillance subsystem, whether by adding Boolean expressions or training segments may include validation. In validation, one or more source documents containing content which is expected to produce one or more alerts are submitted to the content surveillance system to assess whether the expected alerts are generated and whether they are properly associated with a taxonomy node. Validation may also include assessing whether irrelevant material is alerted wherein a source report, which does not include alertable content, is submitted to the content surveillance system. Based on the performance of the content surveillance system in response to these validation source reports, training segments and Boolean search expressions may be added, revised, or removed from the corresponding databases.

Preprocessing to Identify Boilerplate Language and Repetitive Disclosures

Typically once a company discloses a problem or situation, it must continually disclose that problem or situation until the problem disappears. Also, many disclosures include boilerplate language that does not reflect any actual conditions of the entity making the disclosure. The content surveillance subsystem 720 may apply rules for ignoring repetitive or boilerplate language. Additionally, the subsystem may "remember" a legitimate alert from a prior filing as "old news," and not send out a redundant alert.

Also, SEC filings tend to contain volumes of boilerplate language that typically disclose very little of interest. Yet some language could be construed by the content surveillance system 720 potentially alarming. For example, the "Risk Factors" section of a 10-k report typically contains such boilerplate language. It is only when this language changes from one filing to the next that analysts may require alerting. The content surveillance subsystem may optionally include a module containing business rules or other algorithms to detect and ignore boilerplate language.

In accordance with aspects of the invention, the process of identifying and categorizing risk-indicative information (risk alerts) may also include the preliminary step of coarsely categorizing source report fragments as being "relevant" or "irrelevant" using the TAS in conjunction with the harvested positive examples (training segments) and the negative examples. Those fragments identified as irrelevant are discarded, and the identification and categorization of risk-indicative information is performed only on those fragments identified as being relevant. This is described in more detail below.

Alerting Operations, Feedback, and Retraining 240-290

1. Scanning for Alerting 240

With reference to FIG. 7, in an exemplary embodiment, a source report 710 enters the content surveillance subsystem 720 of the risk alert system 700. The source report generally has a single area of interest (e.g., a single company or corporation). Optionally, the content surveillance subsystem 720 may include a boilerplate preprocessing module 705 which removes invariant and irrelevant portions of a source report. Then, using one or more TASs, for example, the Bayesian TAS 731, the support vector machine TAS 732, the Sparse Logistic Regression TAS 733, or other classification algorithms as well known in the art, the content surveillance subsystem 720 determines which, if any, of the training segments stored in its database 735 match text within the source report 710 and further determines the closeness of the match.

A Bayesian-based TAS, such as the Autonomy IDOL server, may break the source report into subdocuments at natural breaks, e.g., pages, paragraphs, sections, etc. Then, in a manner similar to that used when training, the TAS stems the words and creates vectors with their attendant weights.

In general, as is well known in the art, a support vector machine TAS is a supervised learning method used for classification and regression. The support vector machine TAS represents a source document, e.g., an SEC filing, as a point in an n-dimensional space (or an n-dimensional vector) and tries to find, among all the surfaces, the one that separates the positive points from the negative points by the widest possible margin. The derived surface, which is referred to as the decision surface, is expressed as a linear equation, which forms the basis of the categorization model. The resulting equation determines a document's risk taxonomy category.

A useful classification method and algorithm is described by Zhang, Tong, Regularized Winnow Methods, In Advances in Neural Information Processing Systems 13, pages 703-709, 2000, the disclosure of which is hereby incorporated by reference.

The closeness of matches with training segments is determined by comparing source report vectors to training segment vectors, comparing both magnitude and direction to generate a closeness score. The score may be expressed as a percentage with a scale that ranges from 0 to 100%. In order to send relevant alerts and an appropriate number of alerts, a proper score threshold may be set. Selecting a proper threshold involves consideration of "recall" and "precision." "Recall" is the ratio of the number of relevant segments alerted from a source document to the number of relevant segments in the source document. Precision is the ratio of the number of relevant segments to irrelevant segments among those segments alerted. Generally, recall and precision are inversely related. Setting the threshold low increases recall but decreases precision. That is, a low threshold means that it is more likely that alerts will be generated for all "alertable" segments, but also that "unalertable" (i.e., irrelevant) segments are likely to be erroneously alerted. Conversely, setting the threshold higher increases precision, but decreases recall. That is, a high threshold means that all alerts are more likely to be relevant, but it also means that some relevant material may not be alerted. The threshold may be different for different categories.

Optionally, the content surveillance subsystem 720 may also include a Boolean search module 730. The Boolean search module 730 compares Boolean expressions stored in a Boolean search database 736 against the source report 710. Boolean expressions may be generated from the training segment database by an expression generator or keyword extractor. Also, expressions may be added or edited manually.

In embodiments including one or more search engines, i.e., one or more of TASs and a Boolean search module, a virtual committee module 740 processes and consolidates the results. Generally, a segment within a source report which is matched by more than one search engine will be given an enhanced closeness score by the virtual committee 740. Segment(s) having closeness scores meeting or exceeding a predetermined threshold are transmitted to the alert subsystem 770 of the risk alert system along with their score and the ID(s) of the expression or training segment which generated the match.

The virtual committee can rely upon linear or non-linear decision making techniques. For example a virtual committee process could pick alerts based upon those that receive the highest score or those that get a majority vote. Alternatively, an optimization model could approve alerts based upon simple rules, such as one that might assign weightings to each engine and then require each engine to score at least above a certain relevancy threshold, or at least 3 out of 4 engines must score above a certain threshold. Alternatively, a non-linear decision based virtual committee might seek to generate alerts based upon minimizing the scoring dispersion for a distribution of TAS performance metrics.

Additionally the virtual committee could employ a Weighted Linear Combination (WLC), whereby a weighted sum of scores for an alerted training segment produced by the engines yields the final score for that segment. The weight assigned to a particular engine's result in relation to a particular training segment may reflect the expected relative effectiveness of the engine, and usually can be optimized on a validation set. Another method for combing engine results includes Dynamic Classifier Selection (DCS), whereby the engine most effective on a validation examples most similar to the segment is selected, and its judgment adopted by the committee. A still different policy, somehow intermediate between WLC and DCS, is adaptive classifier combination (ACC), whereby the judgments of all the engines contributing to the committee are summed together, but their individual contribution is weighted by their effectiveness on the validation examples most similar to the alerted segment.

2. Alerting 260

Figure 8:
FIG. 8 depicts a sample User/Analyst/Administrator and Area Interest database.

In the alert subsystem 770, the segment(s), score(s), and ID(s) 750 are sent to the report generator 780 which consults the user database 791 to determine to whom the alert should be sent. A portion of an exemplary database 791 is illustrated in FIG. 8. Each area of interest or company 810 is associated with an analyst 820 and administrator 840. A company may further be associated with a backup analyst 830 and practice leader 850. Users and risk analysts may have, for example, twenty to thirty areas of interest (e.g., companies) to follow. An alert notification 792 is generated and sent by the notifier module 785 to the user/risk analyst associated with the source report's area of interest and comprises the area of interest of the alert(s), the category(ies) of the alert(s) (based on looking up the training segment ID(s) in the taxonomy database 775) and a score for each alert. Generally, multiple alerts concerning a single source report 710 and area of interest are consolidated into a single alert notification 792. The alert notification 792 may contain a link or links to a browser view of an alert report, providing ease of access to the alert, its categorization, closeness score and its context. In a preferred embodiment, a link is a clickable hyperlink to an optionally secure web page. However, other links are available; by way of example, but not limitation, a link is a URL or an alert serial number.

Figure 9:
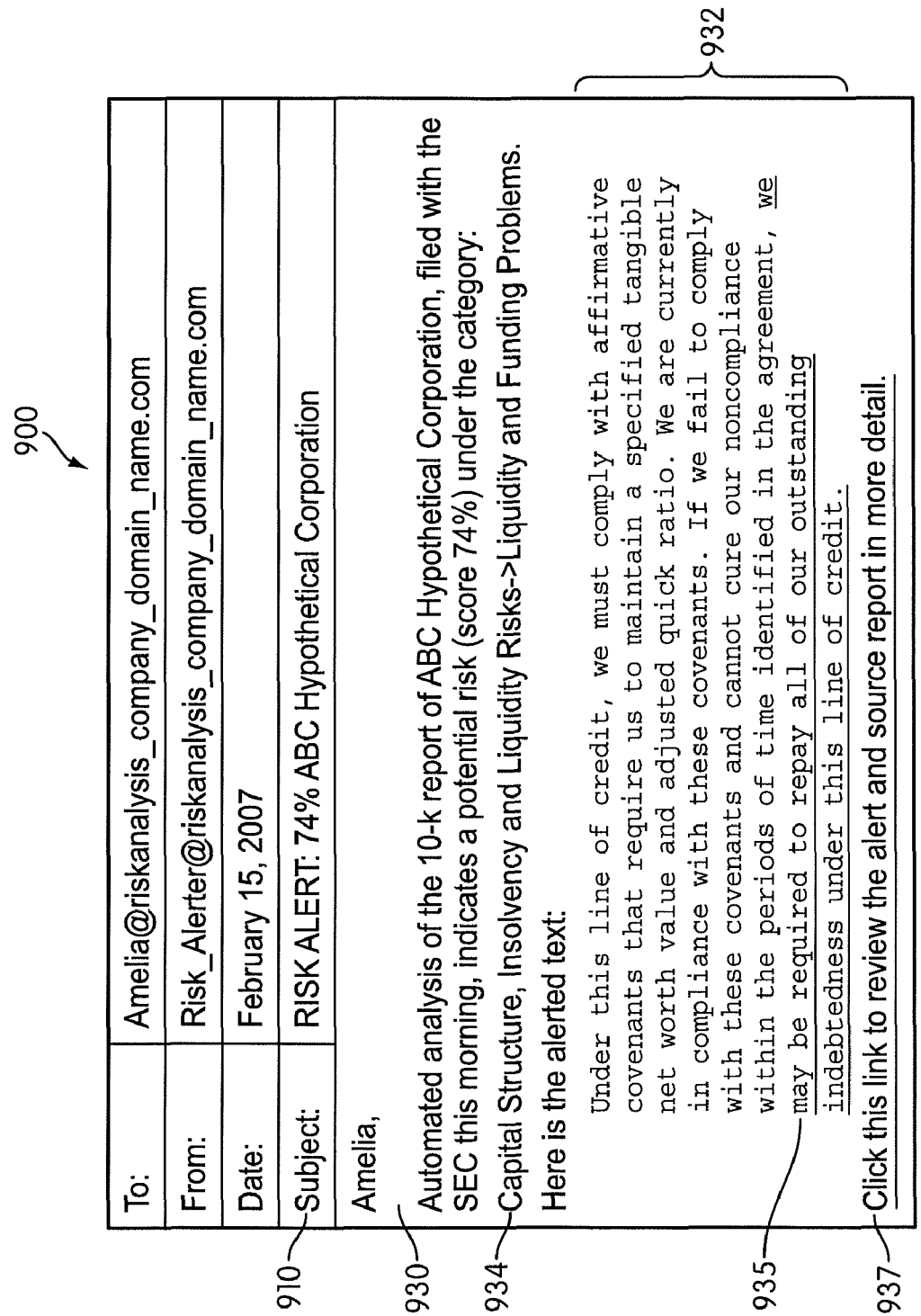
FIG. 9 depicts an alert notification.

In a preferred embodiment, alert notifications 792 arrive at an analyst's desktop via e-mail. With reference to FIG. 9, an alert e-mail notification 900 may have a subject line 910 stating the area of interest of the alert, a priority which is dependent upon the closeness score(s) and/or taxonomy nodes, and a body 930, in which an alerted segment 935 is presented in brief context 932 with its category 934 and a link 937 to an alert report viewable in a browser.

Alert notifications may be made by other communications methods. By way of example, but not limitation, alert notifications are sent via instant messaging, pop-up, text paging or messaging, short message system, facsimile, and automated voice system.

In addition to the analyst/user, an alert notification 792 may optionally be sent to one or more of a backup analyst, administrator, or team leader associated with the area of interest and/or analyst/user as shown in columns labeled Analyst 820, Backup 830, Admin 840, and Team Leader 850 of FIG. 8.

Figure 12:
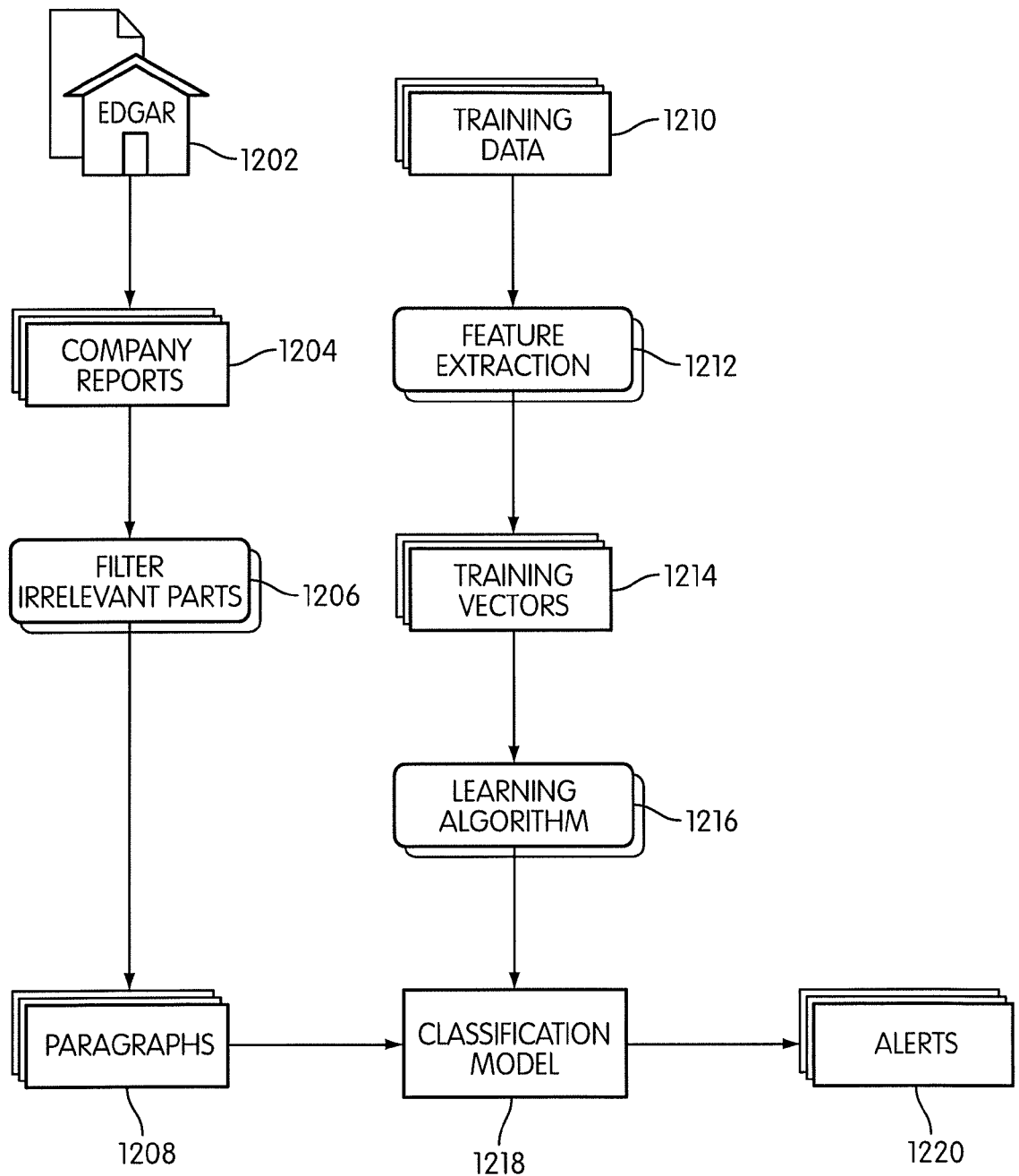
FIG. 12 is a flow chart illustrating steps of a process embodying the invention.

FIG. 12 is a flow chart showing the overall process of training the system, evaluating source documents, and generating alerts. Step 1210 represents the harvesting of training segments from real-world documents. Although not shown in FIG. 12, each segment is categorized under a particular risk within the taxonomy (e.g., as in FIG. 13). In step 1212, features are extracted from the training segments. In accordance with one embodiment, features may comprise words and/or sequences of two or three words within a window of five words. Features that appear in fewer than a predetermined number of documents (user defined) can be deleted. In step 1214, training vectors are generated from the extracted features in a manner described above and well known to those skilled in the art. In step 1216, the learning algorithm, e.g., the linear classifier or support vector machine, builds a model 1218 based on the vectors which represents each of the training examples.

In step 1202 a source of financial or other source reports, e.g., SEC filings (e.g., as provided by Edgar), is accessed and reports of companies of interest are retrieved in step 1204. In step 1206, irrelevant parts of the source documents, or company reports, e.g., boilerplate, are removed, and in step 1208, the document is broken into manageable subparts, such as paragraphs. As with the training data, features are extracted from the source document subparts, and from those features vectors are generated. Using known classifier techniques, such as those embodied in support vector machines or maximum margin classifiers, the vector representations of the source documents are evaluated for matches with vector representations of training segments.

Figure 14:
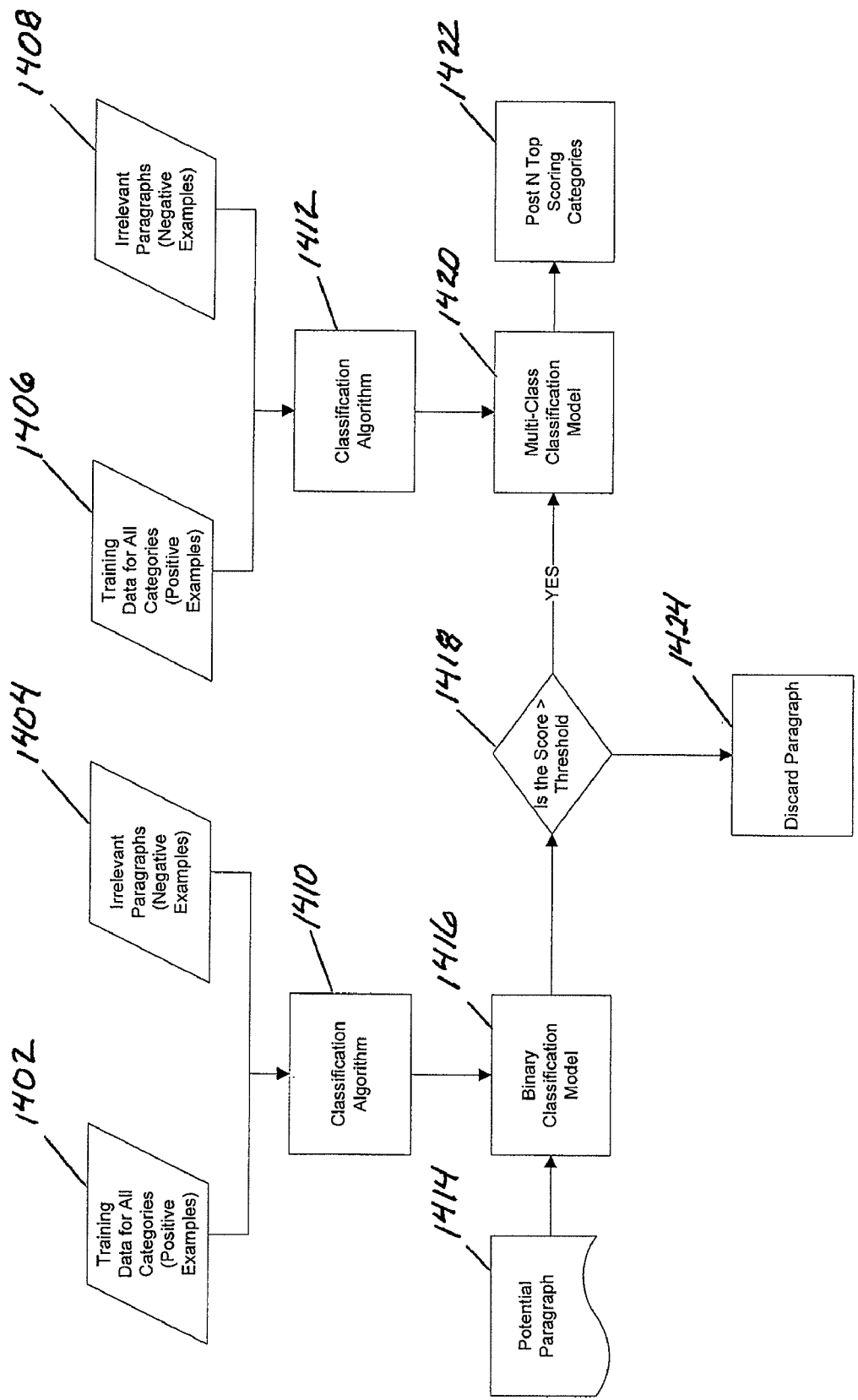
FIG. 14 is a flow chart illustrating steps of a process embodying the invention.

FIG. 14 is a flow chart illustrating further details of aspects of the invention and, in particular, provides further details regarding the process of filtering irrelevant parts of the reports—Step 1206 in FIG. 12.

As illustrated in FIG. 14, the invention, in one embodiment, comprises a two-step approach to the classification of the text fragment candidates. Initially, all positive examples (box 1402) without regard to taxonomical classification and all negative examples (box 1404) are applied to a classification algorithm (TAS) (step 1410) to generate a binary classification model (box 1416). The model 1416 may be created as described in steps 1212, 1214, 1216, and 1218 of FIG. 12. The model at this point is considered binary in the sense that it represents, or classifies, only two categories—relevant (corresponding to any of the positive examples 1402) or irrelevant (corresponding to any of the negative examples 1404. For the first step of the text classification process, each potential paragraph, or other fragment, of the source report (box 1414) is compared to the binary classification model 1416 to distinguish between relevant fragments (those that contain alerts) and non-relevant fragments. In a manner known in the art, the classification algorithm 1410 and the resulting binary classification model 1416 are configured to generate a numeric score for each of the potential paragraphs 1414. Moreover, the classification algorithm 1410 and the resulting binary classification model 1416 may be configured to generate a higher numeric score for potential paragraphs 1414 more closely resembling one or more positive examples 1402 and to generate lower scores for potential paragraphs 1414 more closely resembling negative examples 1404. If the score exceeds a predefined threshold (step 1418) then the potential paragraph or other fragment is deemed relevant and moves to the second step of the process. If the score falls below the threshold then the fragment is deemed irrelevant and is discarded (step 1424).

Alternatively, the classification algorithm 1410 and the resulting binary classification model 1416 may be configured to generate a lower numeric score for potential paragraphs 1414 more closely resembling positive examples 1402 and to generate higher scores for potential paragraphs 1414 more closely resembling negative examples 1404. In such an alternative, if the score falls below a predefined threshold then the potential paragraph or other fragment is deemed relevant and if the score exceeds the threshold the fragment is deemed irrelevant and is discarded.

The inventors have found that up to 98% of the potential paragraphs (fragments) 1414 can be discarded as irrelevant in this first step.

In the second step, all positive examples (box 1406) and all negative examples (box 1408) (positive examples 1406 and negative examples 1408 may be identical to positive examples 1402 and negative examples 1404, respectively) are applied to classification algorithm (TAS) (step 1412) (which may be identical to the classification algorithm used in step 1410) to generate a multi-class classification model (box 1420). The multi-class classification model 1420 represents, or classifies, all categories of the risk alert taxonomy (see, e.g., FIGS. 4 and 13). For this second step of the text classification process, each potential paragraph, or other fragment, identified as being relevant is compared to the multi-class classification model 1420. In a manner known in the art, the classification algorithm 1412 and the resulting multi-class classification model 1420 are configured to generate a numeric score relative to each taxonomic category for the source report fragment. Moreover, the classification algorithm 1412 and the resulting multi-class classification model 1420 may be configured such that the higher the score, the closer the correspondence between the fragment and the positive examples (training segments) of a given category under which those positive examples are classified. After scoring each fragment that passes the first step against each of the predefined categories contained in the risk taxonomy (using the multi-class classification model 1420 built using the positive examples 1406 of each of these categories), the top N (in practice N=3) scoring categories are identified. These identified fragments and the corresponding categories may form the basis of a risk alert report.

3. Viewing 270 an Alert Report

With reference to FIGS. 7, 9, 10A, and 10B, upon following the link contained in an alert notification 792, the user accesses the alert subsystem 770 through a user interface 790. In a preferred embodiment, the user simply clicks on hypertext link 937 in alert e-mail 900 causing the user's browser to access the user interface 790 as a web page. Alternatively, the user may need to first access a browser and type the link either as a URL or as an alert serial number on a predetermined web access page of the alert subsystem. The alert report 1000 (see FIG. 10A) is displayed. In a preferred embodiment, multiple display panes are displayed within the alert report 1000, namely, a metadata pane 1020, a categories pane 1030, a Source Report Content pane 1040, and a Feedback pane 1050.

In the metadata pane 1020, for example, the metadata for the Source Report is displayed. This metadata may comprise the area of interest (e.g., company or corporation) 1022, the date of the Source Report 1021, the source of the Source Report, the type of Source Report 1024, and a link 1023 to the Source Report in its original form.

Figure 10A:
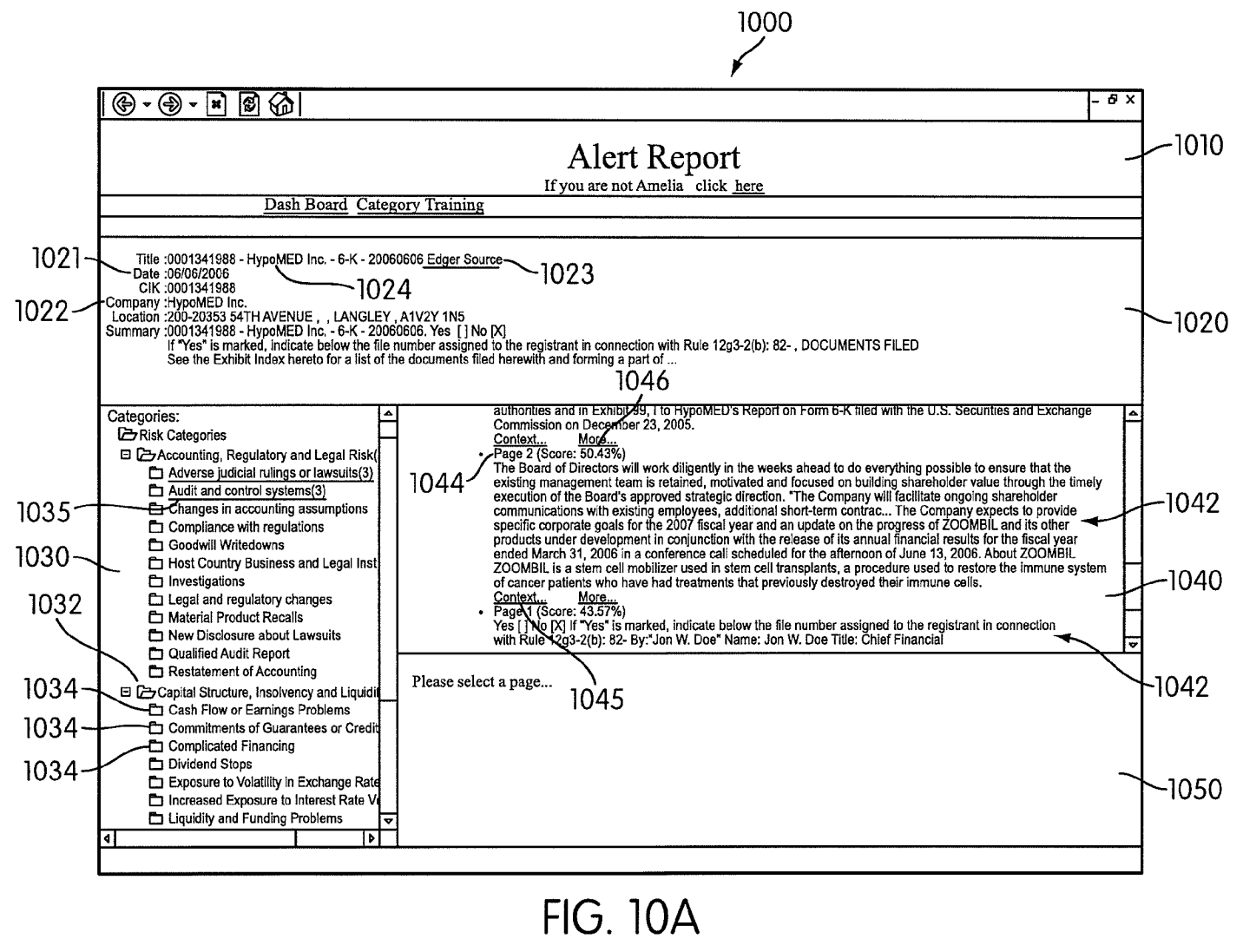
Figure 10B:
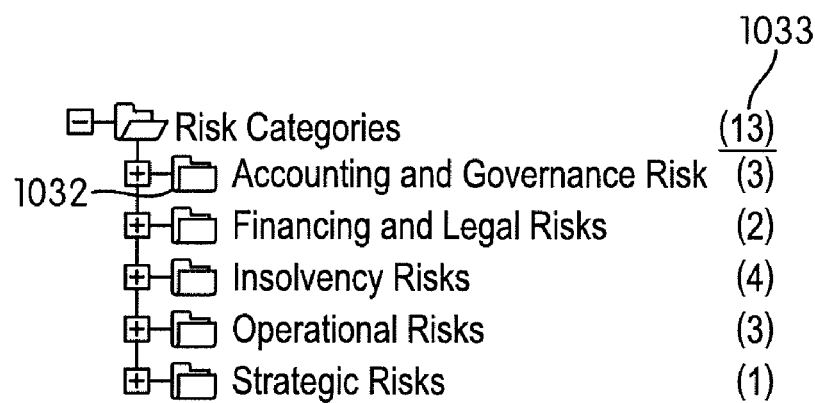
FIG. 10B depicts a collapsed category view of the category pane of an alert report.

In the Categories pane 1030, the risk hierarchical taxonomy is displayed as a collapsible list of folders representing the various hierarchical nodes of the taxonomy which the user may open, close, collapse, and expand. FIG. 10B shows the categories such that all but the top-level node folders 1032 are collapsed. Also, FIG. 10B shows the total number of alerts 1033 for each node in the hierarchy. Lower-level nodes 1034, (see FIG. 10A) are displayed indented underneath a parent (e.g. top-level) node 1032 when that parent node 1032 is expanded. The folders may be labeled with hyperlinked text 1035 which, when clicked, causes a Source Report Content pane 1040 to display segments 1042 of the Source Report for which the content surveillance subsystem 720 determined a match with trained segments with a closeness score exceeding a given threshold.

In one embodiment, the alert report 1000 generally is operable to report all segments within a source report exceeding a given threshold. To the extent this threshold is lower than that used to generate an alert notification (e.g. an alert e-mail), the alert report segments 1042 may include and/or be in addition to the segments for which the alert notification was generated.

For each segment 1042 displayed, there are citations to the page number 1044 of the Source Report where the segment can be found, a hyperlink to additional context of the segment 1045, and a score 1046. Initially, a user or analyst sees the three alerts with the highest relevance score. These alerts are generally the same as those in the alert notification.

The feedback pane 1050 is discussed further in the next section.

Pane 1010 includes links for non-alert aspects of the risk alert system, user authentication, and preference setting.

4. Feedback for Retraining 280

Figure 10C:
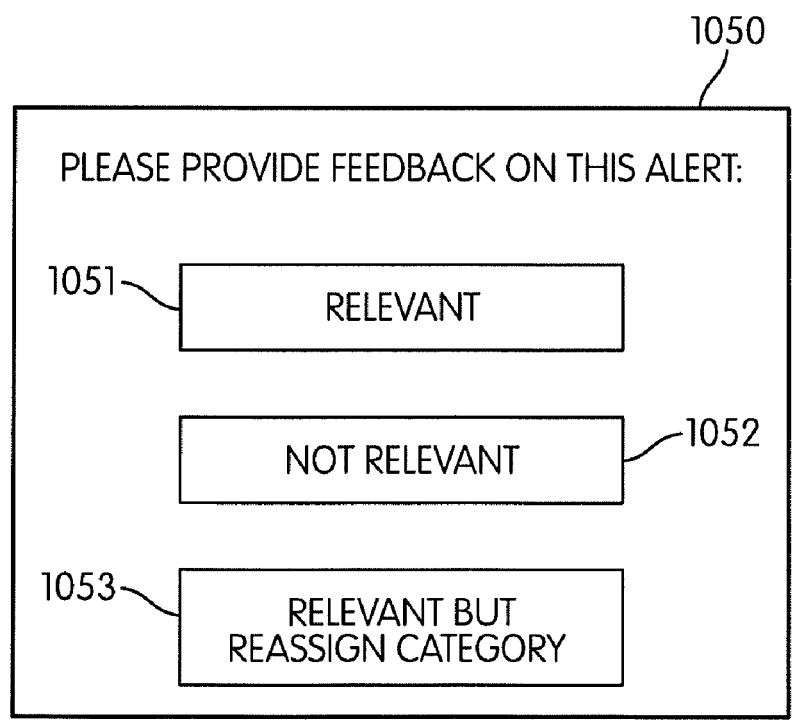
FIG. 10C depicts a feedback form pane.

In an exemplary embodiment, the user selects an alerted segment 1042 in a Source Report Content pane 1040 by clicking on it. As a result, a feedback form is displayed in the feedback pane 1050. With reference to FIG. 10C, the analyst viewing the alert can rate the relevancy of the alerted segment, for example, as relevant 1051 or not relevant 1052. In addition, the analyst may indicate that the alert is relevant, but to a category different than what was identified. Thus, the analyst may select "Relevant but reassign category" 1053. This information is stored in a database and used as feedback to the content surveillance subsystem 720 for "tuning" purposes. For example, an alert segment rated as relevant may be added to the training database and the training segment which generated the alert may be given higher weight.

5. Training Content Surveillance System on a "Missed" Segment 290

Figure 11:
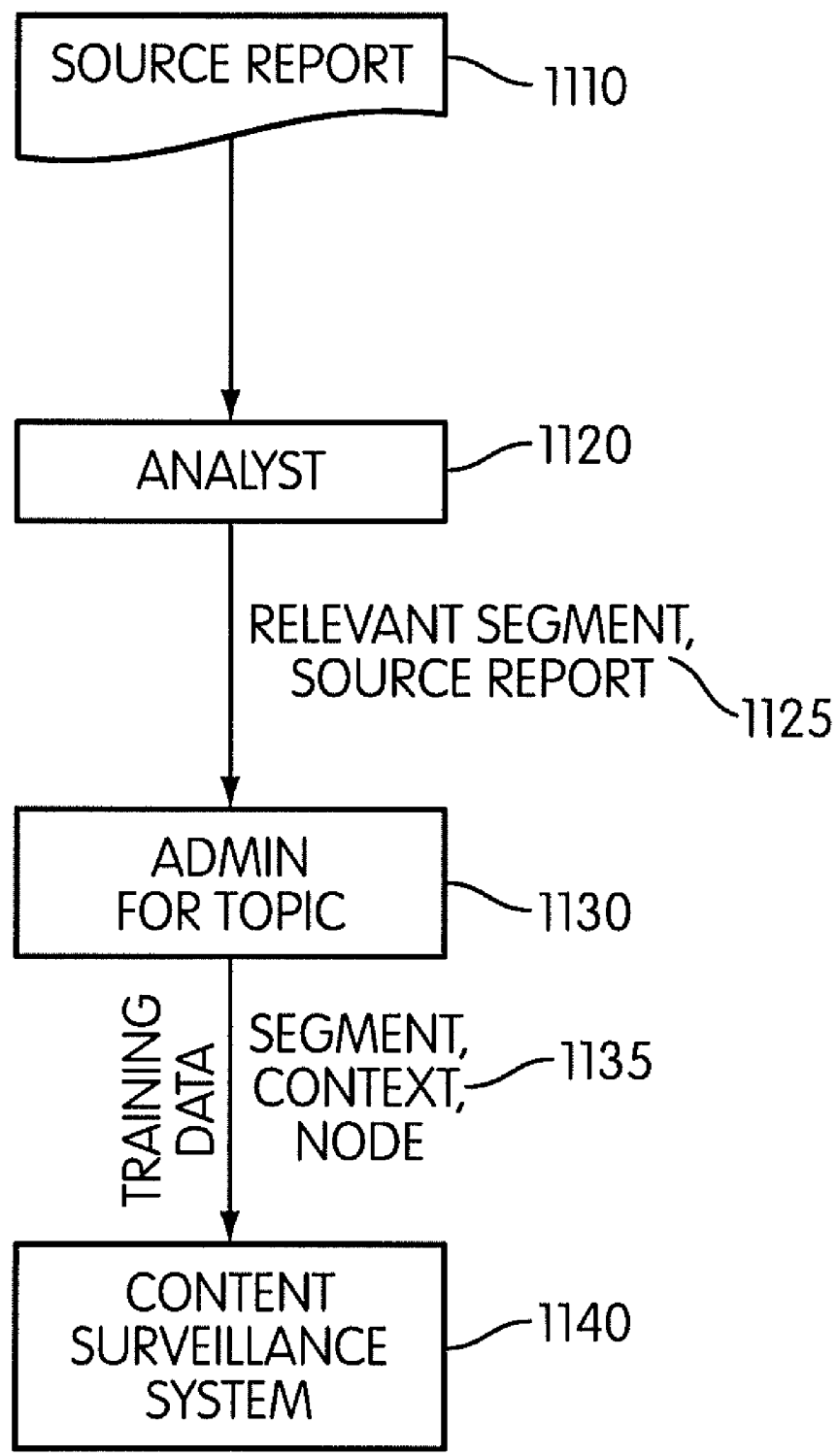
FIG. 11 depicts the process of training the content surveillance system on new or missed material.

With reference to FIG. 11, if an Analyst 1120 discovers a segment within a source report 1110 that "should" have scored well against a category node and/or finds a great example document for a node, she can submit the segment and document 1125 for training the TAS, for example, by sending them as an attachment or message body text of an email to a specific e-mail address reserved for that node in system (e.g. liquidity@riskanalysis_company_domain_name.com). In step 1130, the system polls the inbox for these messages and queues up the documents for review by an Administrator who will make the ultimate decision as to whether to train a node on a submitted segment. In step 1140, the Administrator may use user interface 796 (FIG. 7) to submit documents, training segments 1135 and associated category to the content surveillance system 720. The system tracks document and keyword submission and subsequent training.

6. Reporting and Alert Follow-Up

The alert subsystem 770 provides for reporting system metrics, including:

a. alerts generated by area of interest (e.g. company), by analyst, by topic (e.g. market segment or risk category);

b. alerts read by area of interest, by analyst, by topic;

c. feedback by area of interest, by analyst, by topic, by score, by alert, by relevancy;

d. training history by analyst and by topic.

The alert subsystem 770 may be operable to send rollup reports by team and sector on scheduled bases, for example, at the end of the day, to team and practice leaders. The content surveillance system may also be operable to produce reports for ad hoc queries. For instance, a manager or researcher could query the system to determine what are the most frequent category of alerts for different types of filings, such as a 10-k. Alternatively, ad hoc queries could explore what economic sectors are generating the most alerts as a potential indicator of sector risk. Ad hoc reports can also be generated to monitor system learning status, such as how many new training segments have been added or whether trends are developing concerning the usefulness of the alerts.

Certain nodes in the taxonomy are optionally associated with a designation of "high risk." With reference to FIG. 8, if an alert associated with a high risk node remains unread for a set period, for example 24 hours, an additional alert notification will be sent to the associated analyst 820, the backup analyst 830 and the team leader or other supervisory personnel (e.g. 840). If such an alert remains unread for an additional set period, for example another 24 or 48 hours, alert notifications will again go to the associated analyst 820, the backup analyst 830, the team leader or other supervisory personnel (e.g. 840), and, additionally, the practice leader 850. For alerts in categories not designated "high risk", a longer follow-up time frame is provided, for example, a first round of notifications after 72 or 120 hours and a second round after 96 or 144 hours.

While particular elements, embodiments, and applications of the present invention have been shown and described, it should be understood that the invention is not limited thereto, since modifications may be made by those skilled in the art, particularly in light of the foregoing teaching. The appended claims are intended to cover all such modifications that come within the spirit and scope of the invention. Although multiple embodiments are described herein, those embodiments are not necessarily distinct—features may be shared across embodiments.

We claim:

1. A system for alerting an analyst to the presence of risk indicative information in a source report, the system comprising:
    a processor;
    a content surveillance subsystem including:
        at least two text analysis software modules trained with training segments extracted from historical financial reporting documents, each training segment comprising a previously observed representation of an expression of information indicative of an actual financial risk, said content surveillance subsystem being constructed and arranged to score segments of the source report based on the closeness of each segment to one or more training segments; and
        a virtual committee operable to combine the scores of each of the at least two text analysis software modules; and
    an alert subsystem in communication with said content surveillance subsystem and including a report generator and an alert notifier, wherein the report generator is constructed and arranged to generate a report and said the alert notifier is constructed and arranged to transmit the alert to the analyst, wherein the alert and the report comprise one or more risk indicative segments extracted from the source report by the text analysis software module where the one or more risk indicative segments in the alert are each associated with a score above a pre-determined threshold.

2. The system of claim 1, wherein said content surveillance subsystem further includes a boilerplate preprocessing module operable to identify and remove information from the source report previously determined to be irrelevant to identifying a financial risk before the text analysis software module extracts and scores risk indicative segments of the source report.

3. The system of claim 1, further comprising a taxonomy database in which each training segment is associated with at least one node in the taxonomy database and the report and the alert are organized according to the taxonomy of the one or more risk indicative segments.

4. The system of claim 1, wherein at least one of the text analysis software modules implements a text analysis algorithm comprising a classification algorithm.

5. The system of claim 4, wherein said classification algorithm comprises a maximum margin classifier.

6. The system of claim 1, wherein the alert subsystem further includes:
    an alert report database;
    a user database on which is stored parameters associated with users of the system; and
    a user interface;
    wherein the alert notifier is adapted to transmit the alert to an analyst associated with a topic of the source report as determined by parameters stored in the user database, the report generator is adapted to store the report in the alert report database, and the user interface is adapted to enable the analyst to access the report stored in the alert report database.

7. The system of claim 6, wherein the user interface comprises a web server operable to allow the user to access the report using a web browser.

8. The system of claim 6, wherein the user interface is operable to accept feedback from the analyst indicating whether a particular segment in the report is relevant or irrelevant.

9. The system of claim 1, wherein the alert is transmitted by e-mail.

10. A system for alerting an analyst to the presence of risk indicative information in a source report, the system comprising:
    a processor;
    a content surveillance subsystem including:
        a text analysis software module trained with training segments extracted from historical financial reporting documents, each training segment comprising a previously observed representation of an expression of information indicative of an actual financial risk, said content surveillance subsystem being constructed and arranged to score segments of the source report based on the closeness of each segment to one or more training segments;
        a Boolean searcher; and
        a virtual committee, wherein the Boolean searcher extracts segments matching one or more pre-stored Boolean expressions and the virtual committee is operable to enhance a score of a segment extracted by the text analysis software module where the segment or a portion thereof was also extracted by the Boolean searcher; and
    an alert subsystem in communication with said content surveillance subsystem and including a report generator and an alert notifier, wherein the report generator is constructed and arranged to generate a report and said the alert notifier is constructed and arranged to transmit the alert to the analyst, wherein the alert and the report comprise one or more risk indicative segments extracted from the source report by the text analysis software module where the one or more risk indicative segments in the alert are each associated with a score above a pre-determined threshold.

11. The system of claim 10, wherein said content surveillance subsystem includes at least two said text analysis software modules.

12. The system of claim 10, further comprising a taxonomy database in which each training segment and each pre-stored Boolean expression is associated with at least one node in the taxonomy database and the report and the alert are organized according to the taxonomy of the one or more risk indicative segments.

13. A computer-implemented method for automatically identifying information within a source report that is potentially indicative of a financial risk, said method comprising:
    assembling a plurality of training segments from historical financial documents, each training segment comprising a previously observed representation of an expression of information indicative of an actual financial risk;
    using text analysis software comprising two or more text analysis algorithms to compare content of a source report with the training segments to identify, with each text analysis algorithm, one or more portions of the content having a similarity to one or more training segments and to generate a closeness score reflective of the extent of the similarity of the identified content portion with a particular training segment;

comparing to each other the one or more portions identified with each algorithm and the closeness scores generated with each algorithm;

identifying a single identified portion having a similarity to one or more training segments and generating a single closeness score;

generating a risk alert communication for any identified portions of the content for which the generated closeness score exceeds a predetermined threshold;

transmitting the risk alert communication to at least one analyst; and enabling the analyst to view the identified portion of the source report.

14. The method of claim 13, further comprising organizing the training segments in accordance with a hierarchical taxonomy.

15. The method of claim 13, further comprising a preprocessing step wherein content of the source report predetermined to be irrelevant to financial risk is removed prior to comparing the content of the source report with the training segments.

16. The method of claim 13, wherein the transmitting step includes transmitting by e-mail.

17. The method of claim 16, wherein the risk alert communication includes a link whereby the source report is displayed in a browser window upon the analysts selection of the link.

18. The method of claim 13, wherein the transmitting step is preceded by a step of identifying the analyst by querying a user database for the identity of an analyst associated with a topic of the source report.

19. The method of claim 13, further comprising enabling the analyst to provide feedback regarding the extent to which the content identified by the text analysis software and the closeness score reflect actual financial risks.

20. A computer-implemented method for automatically identifying information within a source report that is potentially indicative of a financial risk, said method comprising:

assembling a plurality of training segments from historical financial documents, each training segment comprising a previously observed representation of an expression of information indicative of an actual financial risk;

using text analysis software to compare content of a source report with the training segments to identify portions of the content having a similarity to one or more training segments and to generate a closeness score reflective of the extent of the similarity of the identified content portion with a particular training segment;

employing a Boolean searcher to identify segments matching one or more of a plurality of Boolean expressions stored in a database and adjusting the closeness score associated with each segment extracted by both the Boolean searcher and the text analysis software;

generating a risk alert communication for any identified portions of the content for which the generated closeness score exceeds a predetermined threshold;

transmitting the risk alert communication to at least one analyst;

enabling the analyst to view the identified portion of the source report.

21. The method of claim 20, wherein the text analysis software comprises more than one text analysis algorithm and wherein the method further comprises comparing the content of the source report with the training segment using each algorithm to identify portions of the content having a similarity to one or more training segments and to generate a closeness score reflective of the extent of the similarity of the identified content portion with a particular training segment;

comparing the portions identified and the closeness scores generated with each algorithm; and identifying a single identified portion having a similarity to one or more training segments and generating a single closeness score.

* * * * *